(12) United States Patent
Diehl et al.

(10) Patent No.: US 9,758,146 B2
(45) Date of Patent: Sep. 12, 2017

(54) DUAL MODE CLUTCH PEDAL FOR VEHICLE

(75) Inventors: Joel Craig Diehl, Austin, TX (US); Dan Warner Harris, Aurora, CO (US); Warner Allen Harris, Aurora, CO (US); Warner Olan Harris, Banning, CA (US); Wayne Turnbow, Centennial, CO (US)

(73) Assignee: Clean Emissions Technologies, Inc., Cornelius, NC (US)

( * ) Notice: Subject to any disclaimer, the term of this patent is extended or adjusted under 35 U.S.C. 154(b) by 349 days.

(21) Appl. No.: 12/748,332

(22) Filed: Mar. 26, 2010

(65) Prior Publication Data

US 2010/0255952 A1  Oct. 7, 2010

Related U.S. Application Data

(63) Continuation-in-part of application No. 12/060,368, filed on Apr. 1, 2008, now Pat. No. 7,921,945, and a
(Continued)

(51) Int. Cl.
*B60W 10/08* (2006.01)
*B60K 6/48* (2007.10)
(Continued)

(52) U.S. Cl.
CPC ............ *B60W 10/08* (2013.01); *B60K 6/48* (2013.01); *B60K 6/547* (2013.01); *B60W 10/02* (2013.01);
(Continued)

(58) Field of Classification Search
CPC ....................................................... B60W 10/08
(Continued)

(56) References Cited

U.S. PATENT DOCUMENTS 1,726,760 A  9/1929  Otwell
2,467,398 A  4/1949  Miller
(Continued)

FOREIGN PATENT DOCUMENTS

CA      2643165    8/2007
CN      1420034    5/2003
(Continued)

OTHER PUBLICATIONS

Search and Examination Report, Singapore Patent Application No. 200805771-3, Oct. 29, 2010, 12 pages.
(Continued)

*Primary Examiner* — Stacey Fluhart
(74) *Attorney, Agent, or Firm* — Kelly Kordzik; Matheson Keys Daffer & Kordzik PLLC

(57) ABSTRACT

In a vehicle having a manual transmission coupled to an internal combustion engine via a first clutch, the first clutch is operable responsive to movement of a clutch pedal. In an engine mode of vehicle operation, the engine propels the vehicle responsive to movement of an accelerator pedal. An electric motor is coupled to the manual transmission for propelling the vehicle in an electric traction motor mode of vehicle operation. Controls are configured for generating a motor demand signal responsive to accelerator pedal position and configured for modifying the demand signal generation responsive to the clutch pedal position.

6 Claims, 11 Drawing Sheets

Related U.S. Application Data continuation-in-part of application No. 12/402,199, filed on Mar. 11, 2009, and a continuation-in-part of application No. 12/721,537, filed on Mar. 10, 2010, now Pat. No. 8,565,969.

(60) Provisional application No. 61/224,611, filed on Jul. 10, 2009, provisional application No. 61/164,378, filed on Mar. 27, 2009, provisional application No. 61/239,760, filed on Sep. 3, 2009, provisional application No. 61/242,370, filed on Sep. 14, 2009.

(51) Int. Cl.
| | |
|---|---|
| *B60K 6/547* | (2007.10) |
| *B60W 10/02* | (2006.01) |
| *B60W 10/11* | (2012.01) |
| *B60W 30/19* | (2012.01) |
| *B60W 10/06* | (2006.01) |
| *B60W 20/00* | (2016.01) |
| *F16H 59/46* | (2006.01) |
| *F16H 63/42* | (2006.01) |

(52) U.S. Cl.
CPC ............ *B60W 10/11* (2013.01); *B60W 30/19* (2013.01); *B60L 2240/423* (2013.01); *B60W 10/06* (2013.01); *B60W 20/00* (2013.01); *B60W 2520/10* (2013.01); *B60W 2540/10* (2013.01); *B60W 2540/14* (2013.01); *B60W 2710/083* (2013.01); *B60Y 2200/14* (2013.01); *F16H 59/46* (2013.01); *F16H 63/42* (2013.01); *Y02T 10/6221* (2013.01); *Y02T 10/6286* (2013.01); *Y02T 10/642* (2013.01); *Y10T 477/26* (2015.01)

(58) Field of Classification Search
USPC .......... 477/5, 83, 181; 475/223; 180/65.245; 903/930, 946
See application file for complete search history.

(56) References Cited

U.S. PATENT DOCUMENTS

| | | |
|---|---|---|
| 2,677,251 A | 5/1954 | Clark et al. |
| 2,810,293 A | 10/1957 | George |
| 2,923,171 A | 2/1960 | George |
| 2,930,242 A | 3/1960 | George |
| 3,209,604 A | 10/1965 | Mitchell |
| 3,241,628 A | 3/1966 | Thomas |
| 3,597,935 A | 8/1971 | Pierrat |
| 3,599,814 A | 8/1971 | Brownfield |
| 3,646,773 A | 3/1972 | Falk |
| 3,716,768 A | 2/1973 | Mason |
| 3,789,962 A | 2/1974 | Frangiudakis |
| 3,792,327 A | 2/1974 | Waldorf |
| 3,882,950 A | 5/1975 | Strohlein |
| 4,193,271 A | 3/1980 | Honigsbaum |
| 4,199,037 A | 4/1980 | White |
| 4,271,677 A | 6/1981 | Harr |
| 4,280,330 A | 7/1981 | Harris |
| 4,438,342 A | 3/1984 | Kenyon |
| 4,448,157 A | 5/1984 | Eckstein |
| 4,461,988 A | 7/1984 | Plunkett |
| 4,470,476 A | 9/1984 | Hunt |
| 4,488,447 A | 12/1984 | Gebhardt |
| 4,531,379 A | 7/1985 | Diefenthaler et al. |
| 4,588,040 A | 5/1986 | Albright, Jr. |
| 4,658,599 A | 4/1987 | Kajiwara |
| 4,711,204 A | 12/1987 | Rusconi |
| 4,712,636 A | 12/1987 | Ishimatsu |
| 4,732,229 A | 3/1988 | Lucht |
| 4,825,663 A | 5/1989 | Nijjar |
| 4,828,452 A | 5/1989 | Bolitho |
| 4,846,327 A | 7/1989 | Mayer |
| 4,947,657 A | 8/1990 | Kalmbach |
| 4,976,114 A | 12/1990 | Manning |
| RE33,687 E | 9/1991 | Greer |
| 5,046,326 A | 9/1991 | Havemann |
| 5,048,657 A | 9/1991 | Dissett |
| 5,049,112 A | 9/1991 | Gunsing |
| 5,190,118 A | 3/1993 | Yelton |
| 5,255,733 A | 10/1993 | King |
| 5,267,635 A | 12/1993 | Peterson |
| 5,301,764 A | 4/1994 | Gardner |
| 5,307,645 A | 5/1994 | Pannell |
| 5,343,970 A | 9/1994 | Severinsky |
| 5,346,031 A | 9/1994 | Gardner |
| 5,522,778 A | 6/1996 | Iwase |
| 5,558,588 A | 9/1996 | Schmidt |
| 5,631,532 A | 5/1997 | Azuma et al. |
| 5,637,987 A | 6/1997 | Fattic |
| 5,644,200 A | 7/1997 | Yang |
| 5,653,302 A | 8/1997 | Edye et al. |
| 5,656,921 A | 8/1997 | Farrall |
| 5,667,029 A | 9/1997 | Urban |
| 5,669,842 A | 9/1997 | Schmidt |
| 5,722,911 A | 3/1998 | Ibaraki |
| 5,755,303 A | 5/1998 | Yamamoto |
| 5,773,904 A | 6/1998 | Schiebold |
| 5,775,449 A | 7/1998 | Moroto |
| 5,799,632 A | 9/1998 | Bennett |
| 5,799,744 A | 9/1998 | Yamaguchi |
| 5,800,132 A | 9/1998 | Marietti |
| 5,801,499 A | 9/1998 | Tsuzuki |
| 5,806,617 A | 9/1998 | Yamaguchi |
| 5,810,321 A | 9/1998 | Presson |
| 5,815,824 A | 9/1998 | Saga |
| 5,823,282 A | 10/1998 | Yamaguchi |
| 5,841,201 A | 11/1998 | Tabata |
| 5,842,534 A | 12/1998 | Frank |
| 5,845,731 A | 12/1998 | Buglione |
| 5,847,469 A | 12/1998 | Tabata |
| 5,862,497 A | 1/1999 | Yano |
| 5,881,564 A | 3/1999 | Kishimoto |
| 5,887,670 A | 3/1999 | Tabata |
| 5,896,750 A | 4/1999 | Karl |
| 5,927,953 A | 7/1999 | Marietti |
| 5,942,879 A | 8/1999 | Ibaraki |
| 5,951,614 A | 9/1999 | Tabata |
| 6,009,371 A | 12/1999 | Kobayashi |
| 6,027,032 A | 2/2000 | Aoki et al. |
| 6,038,877 A | 3/2000 | Peiffer |
| 6,059,059 A | 5/2000 | Schmidt-Brucken |
| 6,080,081 A | 6/2000 | Sauermann |
| 6,112,151 A | 8/2000 | Kruse |
| 6,138,788 A | 10/2000 | Bohner |
| 6,151,891 A | 11/2000 | Bennett |
| 6,155,364 A | 12/2000 | Nagano |
| 6,164,400 A | 12/2000 | Jankovic |
| 6,166,631 A | 12/2000 | Kennedy et al. |
| 6,186,255 B1 | 2/2001 | Shimasaki et al. |
| 6,209,672 B1 | 4/2001 | Severinsky |
| 6,238,814 B1 | 5/2001 | Horiguchi et al. |
| 6,251,046 B1 | 6/2001 | Yoshino et al. |
| 6,260,539 B1 | 7/2001 | Minowa |
| 6,269,713 B1 | 8/2001 | Ohke |
| 6,276,161 B1 | 8/2001 | Peiffer |
| 6,318,486 B2 | 11/2001 | Masaki |
| 6,332,257 B1 | 12/2001 | Reed, Jr. |
| 6,338,391 B1 | 1/2002 | Severinsky |
| 6,340,339 B1 | 1/2002 | Tabata |
| 6,351,957 B2 | 3/2002 | Hara et al. |
| 6,367,570 B1 | 4/2002 | Long, III |
| 6,405,818 B1 | 6/2002 | Anthony |
| 6,419,040 B2 | 7/2002 | Kitano |
| 6,427,100 B1 | 7/2002 | Kaku |
| 6,441,506 B2 | 8/2002 | Nakashima |
| 6,480,767 B2 | 11/2002 | Yamaguchi |
| 6,484,831 B1 | 11/2002 | Gauthier |
| 6,488,345 B1 | 12/2002 | Woody |
| 6,488,609 B1 | 12/2002 | Morimoto |
| 6,504,259 B1 | 1/2003 | Kuroda et al. |

(56) References Cited

U.S. PATENT DOCUMENTS

| | | |
|---|---|---|
| 6,519,513 B2 | 2/2003 | Nakagawa |
| 6,520,160 B2 | 2/2003 | Kojima |
| 6,533,692 B1 | 3/2003 | Bowen |
| 6,554,088 B2 | 4/2003 | Severinsky |
| 6,557,655 B2 | 5/2003 | Ovshinsky |
| 6,558,290 B2 | 5/2003 | Phillips |
| 6,558,827 B1 | 5/2003 | Reiser et al. |
| 6,570,265 B1 | 5/2003 | Shiraishi |
| 6,591,705 B1 | 7/2003 | Reik et al. |
| 6,616,059 B2 | 9/2003 | Sabhapathy et al. |
| 6,616,569 B2 | 9/2003 | Hoang |
| 6,629,027 B2 | 9/2003 | Yamaguchi |
| 6,651,759 B1 | 11/2003 | Gruenwald |
| 6,655,488 B2 | 12/2003 | Braud |
| 6,658,852 B2 | 12/2003 | Frey |
| 6,664,651 B1 | 12/2003 | Kotre |
| 6,672,415 B1 | 1/2004 | Tabata |
| 6,687,603 B2 | 2/2004 | Wakashiro |
| 6,688,411 B2 | 2/2004 | Boggs |
| 6,692,403 B2 | 2/2004 | Charaudeau |
| 6,694,232 B2 | 2/2004 | Saito |
| 6,697,717 B2 | 2/2004 | Shioda et al. |
| 6,705,416 B1 | 3/2004 | Glonner |
| 6,712,165 B1 | 3/2004 | Okazaki |
| 6,721,637 B2 | 4/2004 | Abe |
| 6,735,502 B2 | 5/2004 | Phillips |
| 6,740,987 B2 | 5/2004 | Kitajima |
| 6,745,117 B1 | 6/2004 | Thacher |
| 6,768,932 B2 | 7/2004 | Claypole |
| 6,781,251 B2 | 8/2004 | Takaoka |
| 6,787,932 B2 | 9/2004 | Takaoka |
| 6,796,367 B2 | 9/2004 | Blacquiere |
| 6,802,291 B2 | 10/2004 | Ujifusa |
| 6,805,211 B2 | 10/2004 | Fujikawa |
| 6,808,470 B2 | 10/2004 | Boll |
| 6,840,341 B2 | 1/2005 | Fujikawa |
| 6,851,470 B2 | 2/2005 | Laukhuf |
| 6,857,985 B2 | 2/2005 | Williams |
| 6,862,511 B1 | 3/2005 | Phillips |
| 6,867,509 B1 | 3/2005 | Takaoka |
| 6,868,927 B2 | 3/2005 | Boll |
| 6,881,167 B2 | 4/2005 | Inada |
| 6,892,541 B2 | 5/2005 | Suzuki |
| 6,907,337 B2 | 6/2005 | Phillips |
| 6,915,198 B2 | 7/2005 | Phillips |
| 6,921,984 B2 | 7/2005 | Rogg |
| 6,966,868 B2 | 11/2005 | Stork |
| 6,986,398 B2 | 1/2006 | Obayashi |
| 6,986,645 B2 | 1/2006 | Iwanami |
| 6,991,053 B2 | 1/2006 | Kuang |
| 6,994,177 B2 | 2/2006 | Ito |
| 6,994,360 B2 | 2/2006 | Kuang |
| 6,998,727 B2 | 2/2006 | Gray |
| 7,004,273 B1 | 2/2006 | Gruenwald |
| 7,021,409 B2 | 4/2006 | Tamor |
| 7,035,727 B2 | 4/2006 | De La Salle |
| 7,055,337 B2 | 6/2006 | Horn |
| 7,055,636 B2 | 6/2006 | Komiyama |
| 7,062,371 B2 | 6/2006 | Gault et al. |
| 7,091,839 B2 | 8/2006 | Situ |
| 7,102,313 B2 | 9/2006 | Kadota |
| 7,104,347 B2 | 9/2006 | Severinsky |
| 7,104,920 B2 | 9/2006 | Beaty |
| 7,107,776 B2 | 9/2006 | Ikura |
| 7,111,704 B2 | 9/2006 | Johnson |
| 7,130,766 B2 | 10/2006 | Tanase |
| 7,135,785 B2 | 11/2006 | Kropp |
| 7,143,851 B2 | 12/2006 | Masterson |
| 7,147,072 B2 | 12/2006 | Botti |
| 7,223,200 B2 | 5/2007 | Kojima |
| 7,237,634 B2 | 7/2007 | Severinsky |
| 7,240,749 B2 | 7/2007 | Bhavsar |
| 7,273,119 B2 | 9/2007 | Tsuneyoshi |
| 7,275,610 B2 | 10/2007 | Kuang |
| 7,284,594 B2 | 10/2007 | Sanada et al. |
| 7,285,869 B2 | 10/2007 | Syed |
| 7,301,302 B2 | 11/2007 | Yoshii |
| 7,306,064 B2 | 12/2007 | Imazu |
| 7,315,090 B2 | 1/2008 | Yang |
| 7,392,871 B2 | 7/2008 | Severinsky |
| 7,395,787 B1 | 7/2008 | Claypole et al. |
| 7,407,026 B2 | 8/2008 | Tamor |
| 7,455,134 B2 | 11/2008 | Severinsky |
| 7,469,758 B2 | 12/2008 | Iwanaka |
| 7,469,858 B2 | 12/2008 | Edelson |
| 7,487,852 B2 | 2/2009 | Leone |
| 7,497,198 B2 | 3/2009 | Leone |
| 7,506,711 B2 | 3/2009 | Usoro |
| 7,520,353 B2 | 4/2009 | Severinsky |
| 7,543,454 B2 | 6/2009 | Harris |
| 7,551,064 B2 | 6/2009 | Pudelko et al. |
| 7,559,388 B2 | 7/2009 | Severinsky |
| 7,580,808 B2 | 8/2009 | Bos |
| 7,600,595 B2 * | 10/2009 | Harris ........................ 180/65.31 |
| 7,921,945 B2 | 4/2011 | Harris |
| 7,921,950 B2 | 4/2011 | Harris |
| 8,346,603 B2 | 1/2013 | Sakakibara et al. |
| 8,386,148 B2 | 2/2013 | Hyde et al. |
| 2001/0005807 A1 | 6/2001 | Kitajima et al. |
| 2001/0022245 A1 | 9/2001 | Rogg |
| 2001/0025220 A1 | 9/2001 | Kaneko et al. |
| 2001/0039230 A1 | 11/2001 | Severinsky |
| 2002/0025220 A1 | 2/2002 | Okuda |
| 2002/0040818 A1 | 4/2002 | Maruyama |
| 2002/0116113 A1 | 8/2002 | Kaneko |
| 2003/0041684 A1 | 3/2003 | Jones, Jr. et al. |
| 2003/0055665 A1 | 3/2003 | Fleming |
| 2003/0062205 A1 | 4/2003 | Konrad |
| 2003/0162631 A1 | 8/2003 | Williams |
| 2003/0217876 A1 | 11/2003 | Severinsky |
| 2004/0093264 A1 | 5/2004 | Shimizu |
| 2004/0157704 A1 | 8/2004 | Stork |
| 2004/0160319 A1 | 8/2004 | Joao |
| 2004/0200648 A1 | 10/2004 | Tarasinski |
| 2004/0207205 A1 | 10/2004 | Kikuchi |
| 2005/0043486 A1 | 2/2005 | Okuno |
| 2005/0060076 A1 | 3/2005 | Phillips |
| 2005/0060079 A1 | 3/2005 | Phillips |
| 2005/0060080 A1 | 3/2005 | Phillips |
| 2005/0107198 A1 | 5/2005 | Sowul et al. |
| 2005/0109550 A1 | 5/2005 | Buglione |
| 2005/0113202 A1 | 5/2005 | Miller |
| 2005/0115748 A1 | 6/2005 | Lanier |
| 2005/0173523 A1 | 8/2005 | Yushio et al. |
| 2005/0211479 A1 | 9/2005 | Tamor |
| 2005/0224264 A1 | 10/2005 | Perrin |
| 2005/0231033 A1 | 10/2005 | Ganzel |
| 2005/0251299 A1 | 11/2005 | Donnelly et al. |
| 2006/0058932 A1 | 3/2006 | Garg et al. |
| 2006/0100057 A1 | 5/2006 | Severinsky |
| 2006/0108161 A1 | 5/2006 | Feliss |
| 2006/0111828 A1 | 5/2006 | Alvarez et al. |
| 2006/0129289 A1 | 6/2006 | Kumar et al. |
| 2006/0207274 A1 | 9/2006 | Harris |
| 2006/0213704 A1 | 9/2006 | Mack |
| 2006/0231304 A1 | 10/2006 | Severinsky |
| 2006/0231305 A1 | 10/2006 | Severinsky |
| 2006/0231306 A1 | 10/2006 | Severinsky |
| 2006/0237246 A1 | 10/2006 | Severinsky |
| 2006/0237247 A1 | 10/2006 | Severinsky |
| 2006/0258505 A1 | 11/2006 | Vafidis |
| 2007/0030450 A1 | 2/2007 | Liang |
| 2007/0056784 A1 | 3/2007 | Joe |
| 2007/0080005 A1 | 4/2007 | Joe |
| 2007/0107956 A1 | 5/2007 | Matsubara |
| 2007/0107958 A1 | 5/2007 | Oliver |
| 2007/0124037 A1 | 5/2007 | Moran |
| 2007/0137909 A1 * | 6/2007 | Zillmer et al. ............... 180/65.2 |
| 2007/0169970 A1 | 7/2007 | Kydd |
| 2007/0181355 A1 | 8/2007 | Harris |
| 2007/0199533 A1 | 8/2007 | Takahashi |
| 2007/0246274 A1 | 10/2007 | Dreibholz |
| 2007/0272456 A1 | 11/2007 | Shiiba |
| 2007/0278022 A1 | 12/2007 | Tanishima |

(56) References Cited

U.S. PATENT DOCUMENTS

| | | |
|---|---|---|
| 2008/0000700 A1 | 1/2008 | Kotani |
| 2008/0006467 A1 | 1/2008 | Morishita |
| 2008/0012535 A1 | 1/2008 | Takatsuji |
| 2008/0029319 A1 | 2/2008 | Fleckner |
| 2008/0029320 A1 | 2/2008 | Fleckner |
| 2008/0076616 A1 | 3/2008 | Kidokoro |
| 2008/0096711 A1 | 4/2008 | Smith |
| 2008/0100129 A1 | 5/2008 | Lubbers |
| 2008/0154671 A1 | 6/2008 | Delk |
| 2008/0220933 A1 | 9/2008 | Maeda |
| 2008/0236912 A1 | 10/2008 | Ueoka |
| 2008/0243324 A1 | 10/2008 | Harris |
| 2008/0288132 A1 | 11/2008 | King et al. |
| 2009/0018716 A1 | 1/2009 | Ambrosio |
| 2009/0024267 A1 | 1/2009 | Kawai |
| 2009/0030568 A1 | 1/2009 | Amano |
| 2009/0095549 A1 | 4/2009 | Dalum |
| 2009/0107744 A1* | 4/2009 | Foersterling et al. ... 180/65.225 |
| 2009/0177345 A1* | 7/2009 | Severinsky et al. ............ 701/22 |
| 2009/0254241 A1 | 10/2009 | Basir |
| 2011/0202234 A1 | 8/2011 | Bradley et al. |
| 2013/0073129 A1 | 3/2013 | Martin et al. |

FOREIGN PATENT DOCUMENTS

| | | |
|---|---|---|
| DE | 4204384 A1 | 8/1993 |
| DE | 19528629 A1 | 2/1997 |
| EP | 0492152 | 7/1992 |
| EP | 0645271 | 3/1995 |
| EP | 1068976 B1 | 1/2001 |
| EP | 1140533 | 1/2003 |
| EP | 1297982 A2 | 4/2003 |
| EP | 0784743 | 5/2003 |
| EP | 1759915 | 3/2009 |
| FR | 2699127 | 6/1994 |
| FR | 2910101 | 6/2008 |
| JP | 03239631 A | 10/1991 |
| JP | 07195955 | 8/1995 |
| JP | H07240213 | 9/1995 |
| JP | 10309003 A | 11/1998 |
| JP | 11146502 | 5/1999 |
| JP | 11-299004 | 10/1999 |
| JP | 200023301 A | 1/2000 |
| JP | 2000-337238 | 12/2000 |
| JP | 2001-105910 | 4/2001 |
| JP | 2001-190007 | 7/2001 |
| JP | 2002118903 | 4/2002 |
| JP | 2002-247712 | 8/2002 |
| JP | 2004017890 | 1/2004 |
| JP | 2004092569 A | 3/2004 |
| JP | 2004136743 | 5/2004 |
| JP | 2004236609 | 8/2004 |
| JP | 2004318370 | 11/2004 |
| KR | 20-1999-0000074 | 1/1999 |
| KR | 10-2004-0000730 | 1/2001 |
| KR | 20-0217389 | 3/2001 |
| TW | 493560 | 7/2002 |
| TW | 505338 | 10/2002 |
| WO | WO0075532 A1 | 12/2000 |
| WO | WO2004062957 A1 | 7/2004 |
| WO | WO2005003600 A1 | 1/2005 |
| WO | WO2006038968 | 4/2006 |
| WO | WO2006099427 A2 | 9/2006 |
| WO | WO2007030069 A1 | 3/2007 |
| WO | WO2007097819 A2 | 8/2007 |
| WO | WO2009086135 A2 | 7/2009 |

OTHER PUBLICATIONS

Office Action, China Patent Application No. 200680053009.2, Nov. 3, 2010, 4 pages.
International Search Report and Written Opinion of the International Searching Authority, International Application No. PCT/US2010/028978, dated Dec. 15, 2010.
First Office Action, Japanese Patent Application No. 2008-556310 dated Apr. 5, 2011, 7 pages.
English language Abstract prepared by Japanese Patent Office, Publication No. 2002-247712, date of publication Aug. 30, 2002.
English language Abstract prepared by Japanese Patent Office, Publication No. 2001-105910, date of publication Apr. 17, 2001.
International Preliminary Report on Patentability, Written Opinion of the International Searching Authority, International Application No. PCT/US2009/036904, dated Sep. 21, 2010.
European Search Report, Application. No. EP 11164435; dated Jun. 20, 2011.
United States Patent and Trademark Office, Office Action, U.S. Appl. No. 12/469,493, dated Jun. 10, 2011.
Korean Intellectual Property Office, Notice to File a Response, Preliminary Rejection, Patent Application No. 10-2010-7023374 dated Jan. 11, 2011.
International Search Report and Written from the International Searching Authority, PCT/US2010/048719, mailed Oct. 28, 2010, 8 pages.
Korean Intellectual Property Office, Notice to File a Response, Preliminary Rejection, Patent Application No. 10-2010-7023374 dated Jul. 11, 2011.
Memo Concerning the Official Action Reported in the Covering Letter; Mexican Patent Application No. MX/a/2010/010249, 4 pages.
English Translation of Office Action for Taiwan Invention Patent Application No. 096105113 dated Jun. 29, 2011, 17 pages.
Broderick, "Demonstration of Proton Exchange Membrane Fuel Cell as an Auxiliary Power Source for Heavy Trucks," SAE Transactions, 2000, vol. 109, Previously Presented 783-788, NY, NY.
http://www.gears-manufacturers.com/power-take-offs.html; "Power Take-Offs," 3 pages.
European Search Report dated Nov. 23, 2009, Application No. 06850144.4-2207/199439, 6 pages.
International Preliminary Report on Patentability dated Mar. 9, 2009, Application No. PCT/US06/60833, 12 pages.
International Search Report and Written Opinion Dated Mar. 20, 2008, Application No. PCT/US06/60833, 9 pages.
International Search Report and Written Opinion Dated Nov. 5, 2008, Application No. PCT/US2008/072672, 6 pages.
International Search Report and Written Opinion dated May 14, 2009, Application No. PCT/US2009/036904, 14 pages.
International Search Report and Written Opinion dated Jun. 12, 2009, Application No. PCT/US2009/038938, 12 pages.
Palumbo, Anthony J., et al., "Ultracapacitor Based Hybrid Booster Drive," 20th International Electric Vehicle Symposium and Exposition (EVS 20): Powering Sustainable Transportation, Aug. 2003, revised Jun. 2004, 16 pages.
Southwest Research Institute, "Fuel cell-assisted truck completes cross-country trek," http://www.swri.org/9what/releases/2005/fuelcell.htm, May 26, 2005, SwRI, San Antonio, TX.
U.S. Army Public Affairs Office, "TARDEC Sponsors Cross-Country Fuel Cell Truck Expedition." RDECOM Magazine, Jul. 2005, p. 6, Aberdeen Proving Ground, MD.
European Examination Report; Application No. 09728436.8-2421; dated Sep. 1, 2011.
International Preliminary Report on Patentability and Written Opinion of the International Searching Authority; International Application No. PCT/US2010/028978, dated Sep. 13, 2011, 13 pages.
European Patent Office, Examination Report, Application No. 08797526.4, dated Oct. 12, 2011.
European Patent Office, Search Report, Application No. 08797526.4, dated Sep. 30, 2011.
Translation of EP 0 492 152 A1, European Patent Application No. 91120122.6, filed Nov. 26, 1991.
European Patent Office, Patent Abstracts of Japan, Publication No. 2004-136743.
European Search Report, Application No. EP11164435, Jun. 20, 2011, 7 pages.
Canadian Intellectual Property Office, Examination Report, Application No. 2,643,165, dated Oct. 24, 2012.

(56) References Cited

OTHER PUBLICATIONS

Japanese Patent Office, Notice of Reasons for Rejection, Japanese Patent Application No. 2011-500758, dated Oct. 23, 2012.
Mexican Patent Office, Memo Concerning the Official Action Reported in the Covering Letter; Mexican Patent Application No. MX/a/2010/010249, 5 pages, dated Nov. 27, 2012.
United States Patent & Trademark Office, Non-Final Rejection, U.S. Appl. No. 12/874,838, dated Dec. 5, 2012.
Decision on Rejection, Application No. 2008-556310, Apr. 24, 2012.
International Bureau of WIPO; International Preliminary Report on Patentability, PCT/US2010/047819, Mar. 15, 2012, 7 pages.
United States Patent & Trademark Office, Office Action Summary, U.S. Appl. No. 12/933,415, Jul. 3, 2012.
Hungarian Intellectual Property Office, Search Report and Written Opinion, Application No. 201006777-5, dated May 25, 2012, 14 pages.
Mexican Patent Office, Memo Concerning the Official Action Reported in the Covering Letter: Mexican Patent Application No. MX/a/2010/010249, 8 pages, dated Apr. 10, 2012.
The State Intellectual Property Office of the People's Republic of China, Notice on the First Office Action, Application No. 200980110599.1, dated May 21, 2012.
Intellectual Property Office of Singapore, Search and Examination Report, Singapore Patent Application No. 201007209-8, Aug. 1, 2012.
Korean Intellectual Property Office, Notice to File a Response, Patent Application No. 10-2008-7022954, Sep. 7, 2012.
English Translation, Japanese Patent Application Laid-Open No. 2004-17890, Laid-Open date Jan. 22, 2004.
European Patent Office, Office Action, Application No. 08797526.4, dated Apr. 19, 2013.
Japanese Patent Office, Second Office Action, Japanese Patent Application No. 2011-500758 dated Jul. 30, 2013.
Korean Intellectual Property Office, Notice to File a Response, Patent Application No. 10-2011-7026244, dated Sep. 16, 2013.
Second Office Action, Notice of Reasons for Rejection, Japanese Application No. 2011-220007 dated Sep. 10, 2013.
Translation of Report of the First Office Action, Application No. 200880128284.5, dated Aug. 1, 2013.
European Patent Office, Office Action, Application No. 10719543.2, dated Jul. 24, 2013.
The State Intellectual Property Office of the People's Republic of China, Translation of Notice on the First Office Action, China Patent Application No. 201080011862.4, Oct. 28, 2013, 2 pages.
Australian Government IP Australia, Patent Application No. 2009225808, Patent Examination Report No. 1, date of issue, Sep. 11, 2013.
Mexican Patent Office, Memo Concerning the Official Action Reported in the Covering Letter; Mexican Patent Application No. MX/a12010/010249, 6 pages, dated Nov. 4, 2013.
The State Intellectual Property Office of the People's Republic of China, Notice on the Third Office Action, China Patent Application No. 200980110599.1, Oct. 23, 2013.
United States Patent and Trademark Office, Final Office Action, U.S. Appl. No. 12/874,838, dated Feb. 26, 2014.
Japanese Translation of Japanese Patent Laid-Open Application No. 10-309003 (43) Laid-Open date Nov. 17, 1998, 65 pages.
The State Intellectual Property Office of the People's Republic of China, Notice on the First Office Action, Application No. 200880128284.5, Jan. 29, 2013.
United States Patent & Trademark Office, Non-Final Office Action, U.S. Appl. No. 12/402,199, Jul. 8, 2013.
The State Intellectual Property Office of the People's Republic of China, Notice on the Second Office Action, Application No. 200980110599.1, Mar. 8, 2013.
Non-Final Office Action, Japanese Application No. 2011-220007, mailed Dec. 21, 2012.
English Translation of Office Action for Taiwan Invention Patent Application No. 096105113, Apr. 2, 2012, 1 page.
Patent Cooperation Treaty, Corrected International Preliminary Report on Patentability, Application No. PCT/US06/60833, Mar. 20, 2009, 6 pages.
IP Australia, Patent Examination Report No. 1, Patent Application No. 2008352923, Mar. 15, 2013.
Hungarian Intellectual Property Office, Examination Report, Application No. 201006777-5, mailed Feb. 14, 2013.
United States Patent & Trademark Office, Non-Final Office Action, U.S. Appl. No. 12/933,415, Apr. 25, 2013.
United States Patent & Trademark Office, Non-Final Office Action, U.S. Appl. No. 12/933,415, Apr. 19, 2013.
Patent Cooperation Treaty, Corrected International Preliminary Report on Patentability, International Application No. PCT/US2008/072672, Aug. 11, 2010.
United States Patent & Trademark Office, Final Office Action, U.S. Appl. No. 12/402,199, Aug. 1, 2012.
The State Intellectual Property Office of the People's Republic of China, Notice on the Second Office Action, China Patent Application No. 200680053009.2, Dec. 13, 2011, 5 pages.
United States Patent & Trademark Office, Final Office Action, U.S. Appl. No. 12/874,838, Jun. 20, 2013.
United States Patent & Trademark Office, Non-Final Office Action, U.S. Appl. No. 12/721,537, Jan. 17, 2013.

* cited by examiner

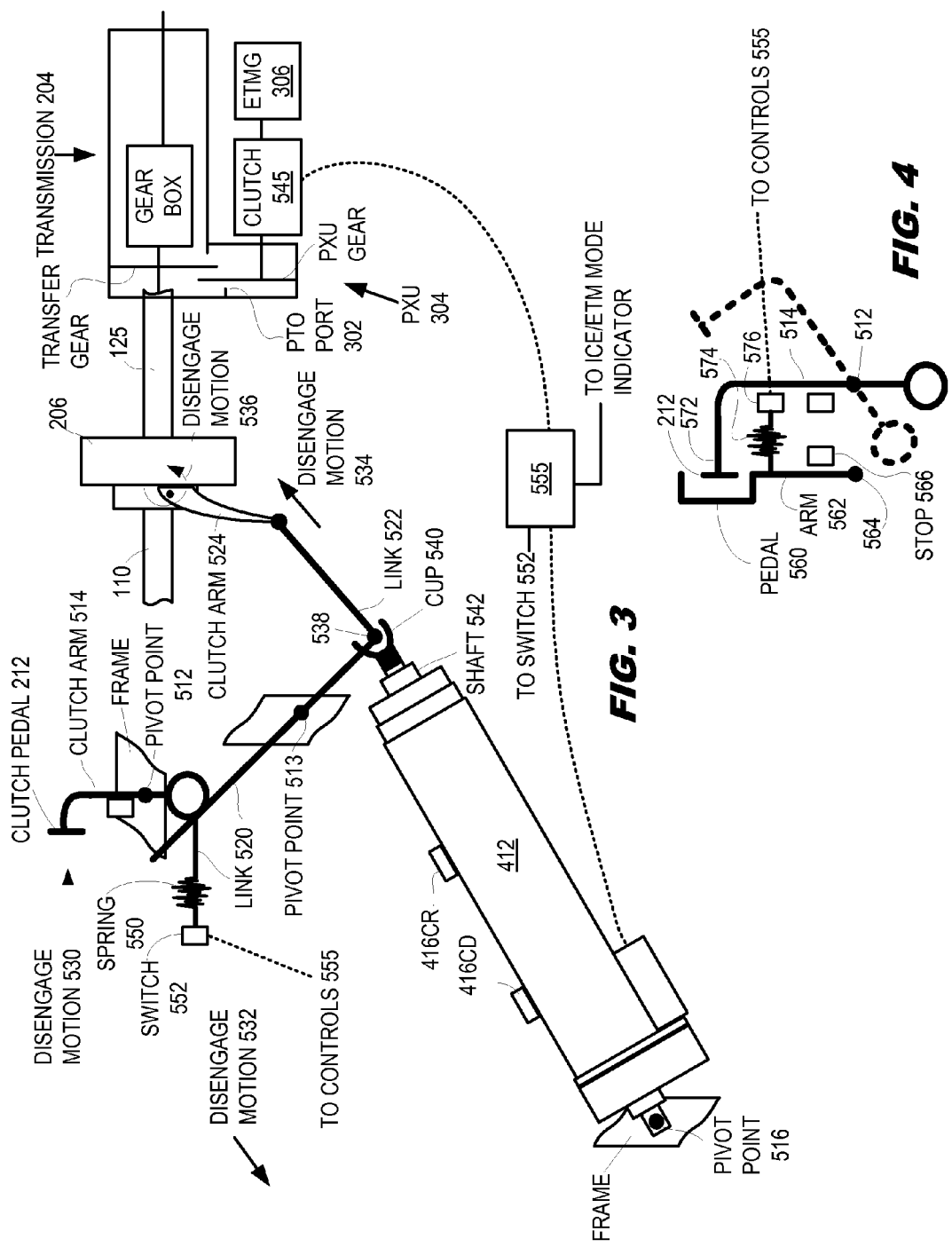

DUAL MODE CLUTCH PEDAL FOR VEHICLE

RELATED APPLICATIONS

This application hereby incorporates herein by reference U.S. provisional patent application Ser. No. 61/164,378, filed Mar. 27, 2009; U.S. provisional patent application Ser. No. 60/909,748, filed Apr. 3, 2007; U.S. provisional patent application Ser. No. 61/224,611, filed Jul. 10, 2009; U.S. provisional patent application Ser. No. 61/239,760, filed Sep. 3, 2009; U.S. provisional patent application Ser. No. 61/242,370, filed Sep. 14, 2009; U.S. patent application Ser. No. 12/060,368, filed Apr. 1, 2008; U.S. patent application Ser. No. 12/402,199, filed Mar. 11, 2009; U.S. patent application Ser. No. 12/721,537, filed Mar. 10, 2010; and PCT patent application no. PCT/US2008/072672, filed Aug. 8, 2008, and claims benefit of priority dates of these applications. This application claims priority to U.S. patent application Ser. No. 12/933,415, which is a continuation-in-part application of U.S. patent application Ser. No. 11/558,786, issued as U.S. Pat. No. 7,600,595, all of which are hereby incorporated by reference herein.

This application also hereby incorporates herein by reference U.S. patent application Ser. No. 11/558,786, filed Nov. 10, 2006 and U.S. patent application Ser. No. 11/374,709, filed Mar. 14, 2006;

TECHNICAL FIELD

This invention relates to a hybrid electric vehicle ("HEV") having a manual transmission selectively disengaged from an internal combustion engine ("ICE") via a clutch, and more particularly relates to such an HEV wherein a clutch pedal for the ICE clutch interfaces with controls for electric motor propulsion of the HEV.

BACKGROUND INFORMATION

Referring to FIG. 1, an original equipment manufactured ("OEM") heavy duty vehicle ("HDV") 202 is shown in block diagram form, which may be, for example, a diesel engine driven, eighteen-wheeler. Vehicle 202 includes a manual transmission 204 coupled to an internal combustion engine 208 by a clutch 206. Gear shift lever 210 is connected (not shown) to the gear box (not shown) of transmission 204. Clutch pedal 212 is operated by a driver to engage and disengage clutch 206. Steering wheel 214, which is for steering vehicle 202, is also shown. The vehicle 202 electrical system 218 is powered by a 12 volt battery 216, which is recharged by an alternator (not shown) powered by ICE 208. Auxiliary systems 220 are also powered by ICE 208.

BRIEF DESCRIPTION OF THE DRAWINGS

FIG. 3 illustrates retrofit linkage and controls for an ICE clutch, according to an embodiment of the present invention.

FIG. 4 illustrates an overlay clutch pedal arrangement, according to an embodiment of the present invention.

DETAILED DESCRIPTION

In the following description of embodiments of the invention, reference is made to the accompanying drawings illustrating embodiments in which the invention may be practiced. It should be understood that other embodiments may be utilized and changes may be made without departing from the scope of the present invention. The drawings and detailed description are not intended to limit the invention to the particular form disclosed. On the contrary, the intention is to cover all modifications, equivalents and alternatives falling within the spirit and scope of the present invention as defined by the appended claims. Headings herein are not intended to limit the subject matter in any way.

Referring again to FIG. 1, in a conventional OEM HDV, the gears in the gear box of transmission 204 are shifted by disengaging the internal combustion engine ("ICE") prime mover 208 from the manual transmission 204 via manually operated clutch 206. In the above mentioned related patent applications, a retrofit arrangement is disclosed in which an electric traction motor/generator ("ETMG") is coupled to the manual transmission via a power takeoff port ("PTO"). According to this arrangement, in an ETM mode wherein the vehicle's prime mover is the electric traction motor ("ETM"), the ICE is disconnected from the transmission by disengaging the clutch, i.e., the conventional clutch located between the ICE and the transmission. Shifting gears in ETM mode may be done without the use of this clutch, i.e., with the clutch continuously disengaged. But in order to shift into a new gear, the transmission must first be shifted into neutral and the ET motor rotation speed must then be matched with that of the new gear of the transmission gear box.

Figure 1:
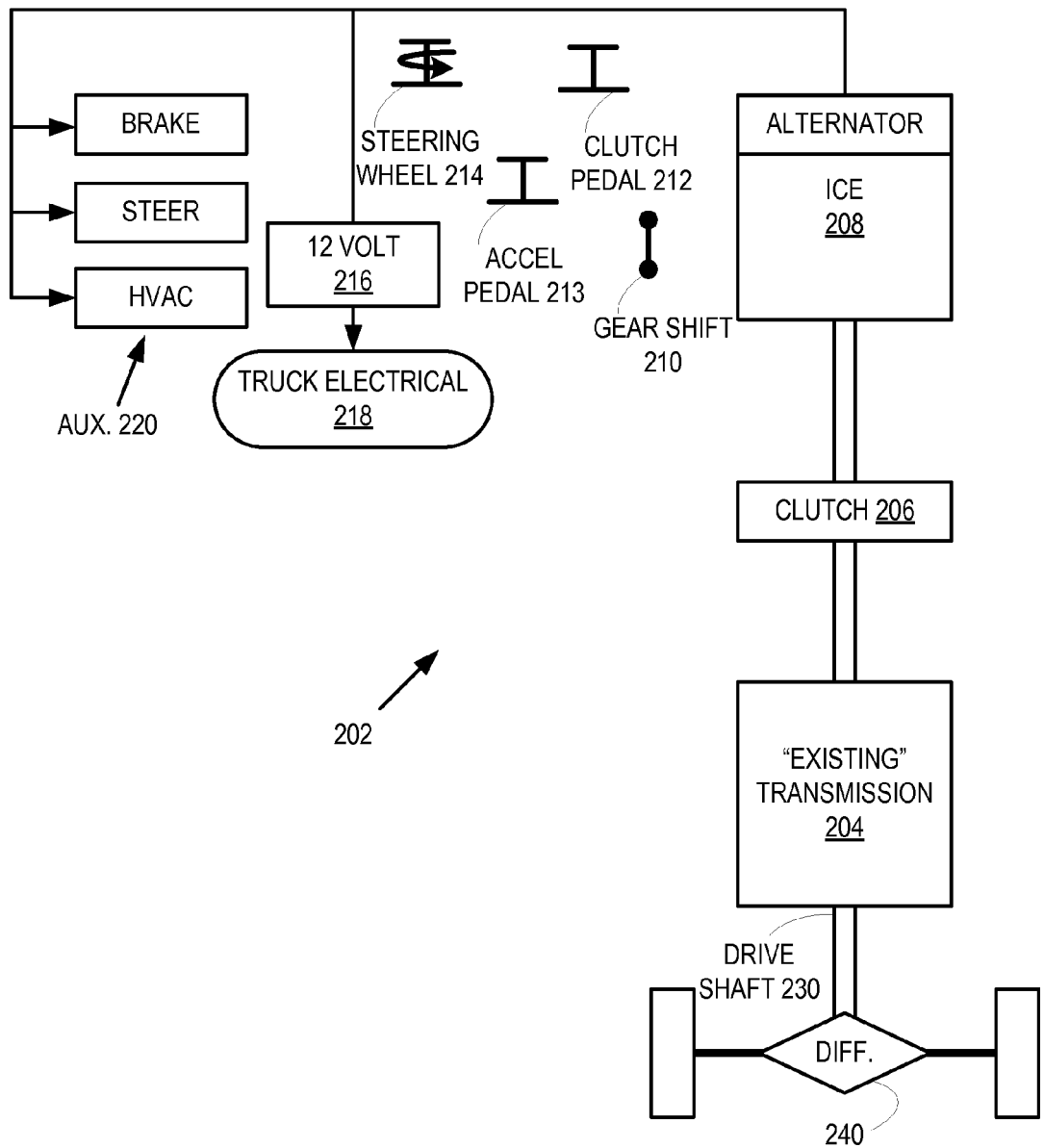
FIG. 1 illustrates an original equipment manufactured HDV.
Figure 2:
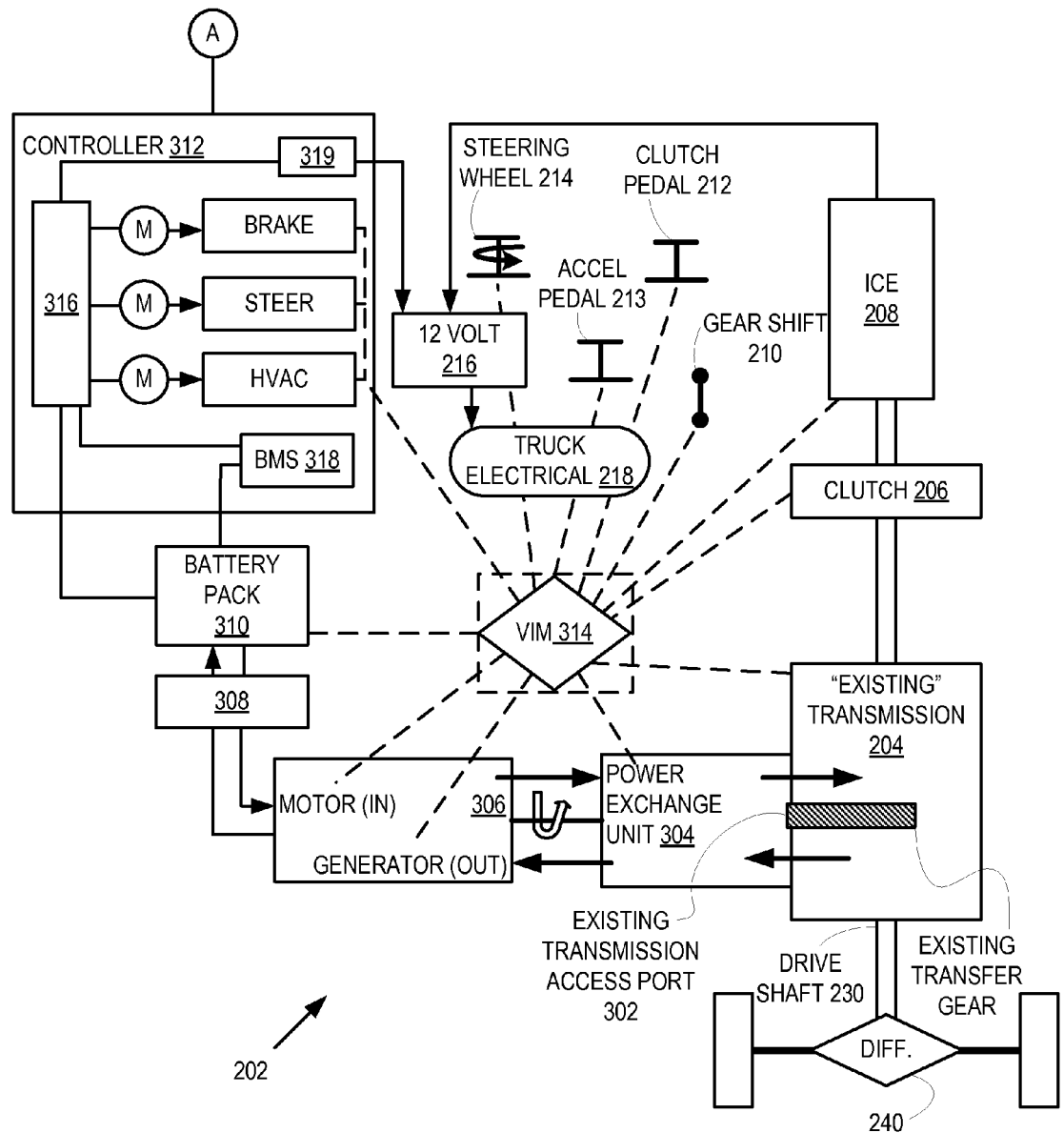
FIG. 2 illustrates an OEM HDV retrofitted with an electric traction ("ET") system, according to an embodiment of the present invention.

Referring now to FIG. 2, a block diagram is shown of an OEM HDV 202 retrofitted with an electric traction ("ET") system, according to an embodiment of the present invention. Aspects of transmission 204, clutch 206, ICE 208, gear shift 210, clutch pedal 212, steering wheel 214, battery 216, and electrical system 218 are as shown in FIG. 1. Power exchange unit ("PXU") 304 is coupled to a transfer gear (not shown in FIG. 2) of transmission 204 via PTO port 302 (also referred to herein as "transmission access port"). ETMG 306 is mechanically coupled to PXU 304 via the shaft (or gear) of ETMG 306. The electrical connections of ETMG 306 are connected to rectifier/inverter 308, which converts the electrical output of ETMG 306 to charge battery pack 310 when ETMG 306 is driven by PXU 304 to operate as a generator. When ETMG 306 operates as an electric motor, rectifier/inverter 308 converts the stored electrical energy of battery pack 310 to drive ETMG 306, which mechanically drives PXU 304 to propel vehicle 202 via the transfer gear of transmission 204. Battery pack 310 may be an Altair Nanotechnology 15 KWh 300-400 VDC, in an embodiment of the invention.

While the ETM speed may be adjusted by manual operation of accelerator pedal 213, and while the related patent applications disclose embodiments of inventions having speed display and automatic control features that may further help in matching ETM and gear box speeds, situations may still arise in which it is desirable to unload or at least partially unload the gear box gears in ETM mode responsive to conventional clutch pedal movement. That is, movement of the vehicle causes the road wheels to rotate, which, in turn, causes the gear box gears to rotate. When the transmission gear box gears are connected to the ICE crankshaft or to the ETMG shaft, the gear box gears are subject to a greater torque load due to the ICE or ETMG load on the gear box gears, even if the ICE or the ETMG are rotating freely. It may be desirable to reduce that torque load by disconnecting the ICE or the ETMG from the gear box.

Further, it may be advantageous for the driver to actually shift gears in ETM mode in the same manner as in ICE mode, i.e., by depressing the clutch pedal to disengage the prime mover from transmission 204, regardless of whether the prime mover is ETM 306 or ICE 208.

Referring now to FIG. 3, an arrangement is shown that enables conventional clutch pedal 212 to operate PXU clutch 545 when in ETM mode and ICE clutch 206 when in ICE mode, according to an embodiment of the present invention. Clutch 206 is for disengaging the ICE from manual transmission 204. It should be appreciated that the illustration is generally indicative of linkage between actuator 412 and clutch 216, but is somewhat schematic in nature. That is, in FIG. 3 some mechanical details may be omitted or depicted figuratively in order to more clearly depict particular features and aspects of how the illustrated arrangement operates. For example, PXU 304 may have two or more gears even if PXU 304 has a fixed gear ratio. Nevertheless, PXU 304 is depicted in FIG. 3 as having a single gear. In addition to depicting actuator 412 of the present invention and its associated linkage, FIG. 3 also depicts conventional linkage for conventional clutch pedal 212 and conventional clutch 206, as follows.

FIG. 3 depicts an instance with clutch pedal 212 in a resting position in which ICE clutch 206 is engaged. In order to disengage clutch 206, a driver conventionally depresses conventional clutch pedal 212 in the vehicle cab, thereby causing disengage motion 530. Clutch pedal 212 is on clutch pedal arm 514, which is rotatably fixed to pivot point 512, so that disengage motion 530 transmits disengage motion 532 via clutch pedal arm 514 to link 520. Link 520 has a distal end opposite the engagement of link 520 to clutch pedal arm 514 and rotatably connected 538 to link 522. Also, link 520 is rotatably fixed to pivot point 513. Thus, link 520 transmits disengage motion 532 to link 522, causing disengage motion 534 in link 522. Link 522 has a distal end opposite its coupling to link 520 and rotatably connected to clutch arm 524, which is rotatably coupled to clutch 206 and engages a throw out bearing (not shown) of clutch 206. Thus, link 520 transmits disengage motion 534 to clutch arm 524, causing disengage motion 536 by clutch arm 524, which causes the throw out bearing of clutch 206 to disengage clutch 206, thereby disengaging crank shaft 110 from transmission input shaft 125.

According to an embodiment of the present invention, actuator 412 and its associated linkage may be added as follows to conventional linkage described in the above paragraph. Actuator 412 may be rotatably secured at one end to the chassis of the vehicle at pivot point 516. An extendable/retractable shaft 542 of actuator 412 (shown in FIG. 3 in its fully retracted position) at the other end of actuator 412 may be secured by cup 540 to connection 538 of links 520 and 522, such that links 520 and 522 have sufficient freedom of movement to allow conventional operation by foot pedal 212, as described immediately above, but the secure coupling of cup 540 to connection 538 is such that it still enables actuator shaft 542 to also transmit disengage motion 534 to link 522 by driving shaft 542 toward its fully extended position.

To reiterate, the arrangement illustrated in FIG. 3 allows freedom for conventional movement of links 520 and 522 for conventional clutch pedal 212 operation of clutch 206 without extending or retracting shaft 542 of actuator 412, which has been added to the conventional linkage between clutch 206 and clutch pedal 212. That is, cup 540 captures coupling 538 loosely enough to permit this freedom of conventional movement, but tightly enough so that shaft 542 remains engaged with coupling 538 throughout the range of conventional motion of clutch pedal 212 and the corresponding range of motion of coupling 538. Also, this maintained engagement enables actuator 412 to provide an alternative means for disengaging and reengaging clutch 206. For disengaging, actuator 412 drives link 522 in disengaging motion 534 by extending shaft 542. The conventional clutch 206 includes a spring return mechanism or mechanisms (not explicitly shown in FIG. 3) such that clutch 206 reengages merely by the retracting of shaft 542. That is, the spring return mechanism of clutch 206 moves clutch arm 524 to the reengaged position such that engagement of cup 540 and coupling 538 is maintained even though shaft 542 retracts.

Limit switches 416CR and 416CD mounted on actuator 412 sense the position of shaft 542 and are used by control logic (shown in FIGS. 5B, 6B, and 7 according to various embodiments of the invention) to determine when to start and stop moving the actuator between an extended and retracted position. For example, actuator limit switch 416CR may close upon sensing that actuator 412 has moved away from a fully retracted position and limit switch 416CR may open upon sensing that actuator 412 has fully retracted.

In an embodiment of the present invention, clutch 545 (which includes an actuator) is provided between ETMG 306 and PXU 304. Further, link 520P is provided to disengage clutch 545 responsive to movement of clutch pedal 212, as follows. Clutch pedal 212 linkage includes link 520, which touches clutch pedal arm 514 at a certain point on a ball or rod shaped portion thereof. Link 520P touches clutch pedal arm 514 at substantially the same certain point and is spring 550 loaded such that in ETM mode, spring 550 and link 520P hold clutch pedal arm 514 in the same position as shown in FIG. 3 even after actuator 412 moves link 520, link 522, and clutch arm 524 to the ICE clutch-disengaged position, which would otherwise release clutch pedal arm 514 from its clutch-engaged position.

Control logic 555 is provided, and is operable to sense whether the vehicle is in ICE or ETM mode. Responsive to the driver depressing clutch pedal 212, link 520P operates electrical or hydraulic switch 552. In turn, switch 552 responsively signals control logic 555 that pedal 212 has been depressed. Responsive to receiving this signal and also sensing that the vehicle is in the ETM mode, control logic 555 operates the actuator of PXU clutch 545 such that clutch 545 moves to the disengaged position. Conversely, when the driver releases clutch pedal 212 in ETM mode, spring 550 for link 520P returns link 520P (and, correspondingly, clutch pedal 212) to the clutch-engaged position shown in FIG. 3, so that switch 552 responsively signals control logic 555 to cause the actuator of PXU clutch 545 to move clutch 545 back to the engaged position. Responsive to sensing that the vehicle is in ICE mode, control logic 555 overrides the above described response, i.e., ignores the signal that pedal 212 has been depressed, insofar as logic 555 does not cause the actuator of PXU clutch 545 to move clutch 545 to the disengaged position.

The above described arrangement enables conventional clutch pedal 212 to operate PXU clutch 545 when in ETM mode and ICE clutch 206 when in ICE mode. Thus, from the point of view of the driver, the motive force is disengaged from transmission 204 responsive to depressing clutch pedal 212, regardless of whether in ETM mode or ICE mode. Thus, aside from differences in freewheeling response of the ET motor and the ICE, shifting gears is the same in ETM and ICE modes insofar as clutch pedal operation is concerned. (Elimination or mitigation of differences in freewheeling response is addressed herein below and is addressed in more detail in one or more of the above referenced, related patent applications.)

Note also that one or more of the above referenced, related patent applications describe in detail the changing of ETMG 306 speed or torque regulation responsive to a signal indicating manual gear shifting or an intention to manually shift. That is, in general, control logic generates a demand signal to ETMG responsive to accelerator pedal 213 position, wherein the control logic increases ETMG torque demand responsive to increasing accelerator pedal 213 displacement. Responsive to detecting a shifting mode, in which shifting is occurring or at least about to occur, control logic reduces the torque demand response to accelerator pedal 213 displacement. That is, for a given accelerator pedal 213 displacement, the control logic generates a smaller torque demand signal in shifting mode than when not in shifting mode.

According to an embodiment of the invention having the herein described PXU clutch 545, control logic 555 may disengage clutch 545 responsive to sensing transmission gear box shifting (or intention to shift) and sensing that the vehicle is in ICE mode. This ICE mode clutch 545 disengagement may be either in addition to or instead of ETMG speed or torque regulation.

Referring now to FIG. 4, an overlay clutch pedal arrangement is illustrated, according to an embodiment of the present invention, wherein pedal 560 overlays conventional pedal 212 and is rotatably connected via arm 562 to a pivot point 564 that is, in turn, secured in a fixed position relative to the floor of a cab of vehicle 202 (FIG. 2). Thus, responsive to a driver depressing pedal 560, thereby causing pedal 560 to rotate via arm 562 about pivot point 564, this causes pedal 560 to depress pedal 212, thereby causing pedal 212 to rotate via arm 514 about pivot 512 point. (The range of motion for pedal 560 may be limited by stop 566.)

Referring now to FIGS. 3 and 4 together, according to the overlay clutch pedal 560 arrangement, a spring 574 loaded link 572 resiliently engages pedal 560 arm 562, thereby resiliently holding pedal 560 in the clutch engaged position shown in FIG. 4 even when the vehicle is switched to ETM mode, in which actuator 412 automatically disengages ICE clutch 206 and, correspondingly, moves conventional pedal 212 to the ICE clutch 206 disengaged position shown by dashed lines in FIG. 4. In this manner, a driver's foot can still rest on pedal 560 resiliently held in a clutch engaged position in ETM mode, although ICE clutch 206 is disengaged and pedal 212 has been depressed as a result of action by actuator 414.

In addition, responsive to the driver manually depressing pedal 560, arm 562 moves link 572 to actuate a switch 576, which signals control logic as is further explained herein below.

Figure 5A:
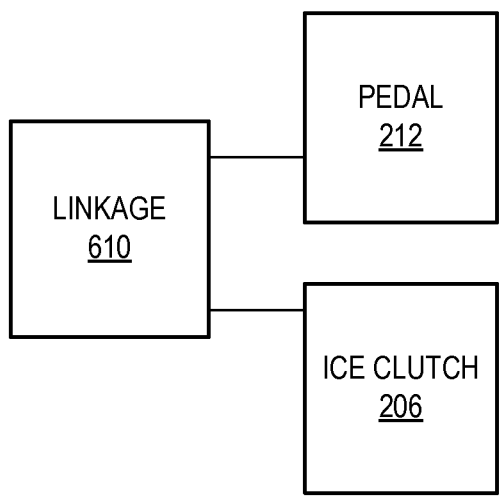
FIG. 5A is a block diagram representation of the arrangement of the clutch pedal, linkage and clutch shown in FIG. 1.

Referring now to FIG. 5A, a block diagram representation is shown illustrating prior art clutch pedal 212, linkage 610, and clutch 206 arrangement of FIG. 1. Linkage 610 may include, for example, clutch pedal arm 514 and links 520 and 522, as shown in FIG. 3.

Figure 5B:
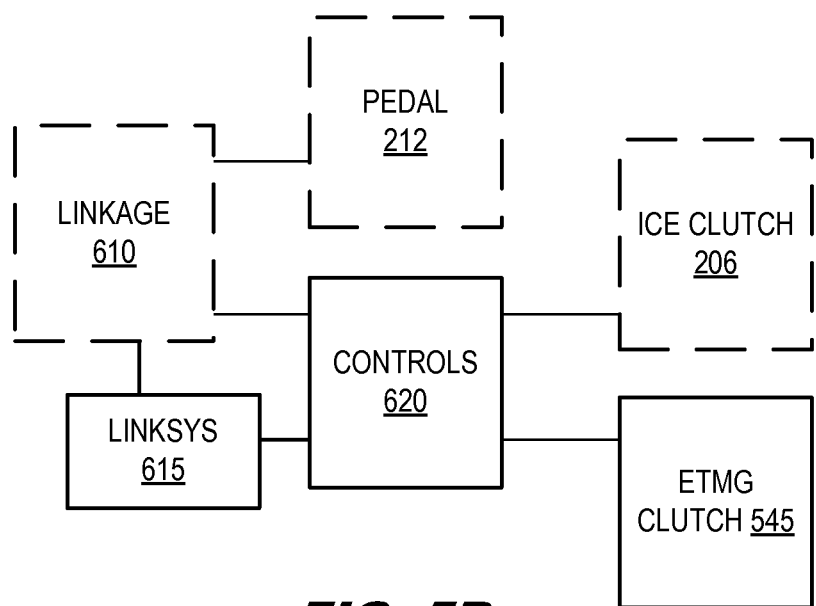
FIG. 5B is a block diagram representation of a retrofit linkage, controls and electric traction motor generator ("ETMG") clutch connected to an OEM linkage and ICE clutch, according to an embodiment of the present invention.

Referring now to FIG. 5B, a block diagram representation is shown illustrating the addition of linkage 615 and controls 620 connected to linkage 610 and ICE clutch 206, according to an embodiment of the present invention. In the embodiment of the invention shown in FIG. 3, for example, linkage 615 of FIG. 5B includes spring 550 loaded link 520P, and controls 620 of FIG. 5B include limit switches 416CD and 416CR, actuator 412 for ICE clutch 206, as well as switch 552, control logic 555 in communication with an ICE/ETM mode indication, and a clutch actuator for clutch 545. In that embodiment, actuator 412 is not interposed between original clutch pedal arm 514 and clutch arm 524. In another embodiment of the invention, controls 620 of FIG. 5B may include pneumatic, hydraulic, or electric control logic and devices interposed between original clutch pedal arm 514 and clutch arm 524, such that in ICE mode, controls 620 automatically hold ETMG clutch 545 engaged while engaging or disengaging ICE clutch 206 responsive to clutch pedal 212, whereas in ETM mode, controls 620 automatically hold ICE clutch 206 disengaged while engaging or disengaging ETMG clutch 545 responsive to clutch pedal 212.

Figure 7:
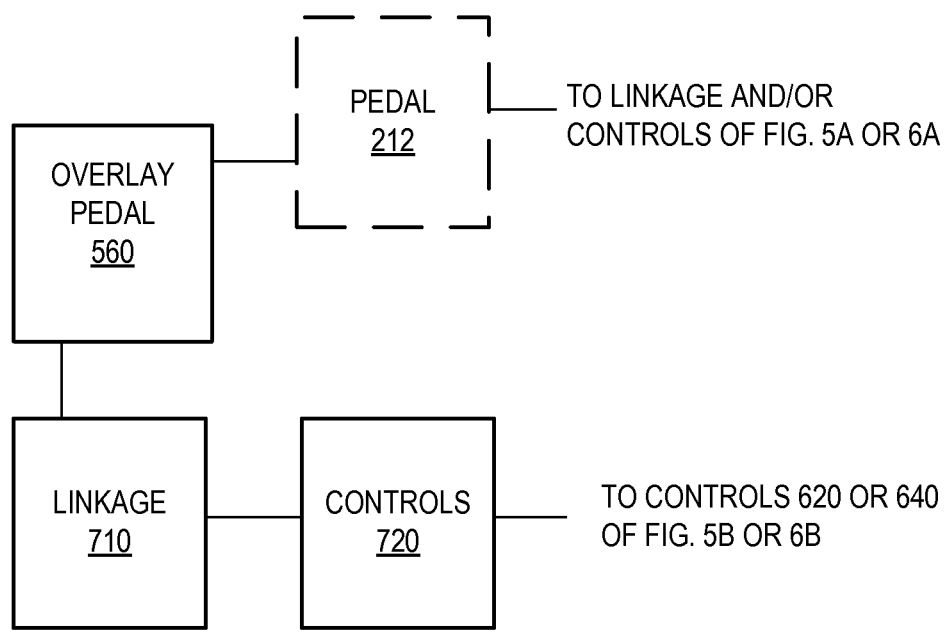
FIG. 7 is a block diagram representation of aspects of the overlay pedal arrangement of FIG. 4, according to an embodiment of the present invention.

As previously described with regard to FIG. 4, a driver may manually depress overlay pedal 560, causing arm 562 to move link 572, which actuates a switch 576 for signaling control logic. Referring now to FIG. 7, a block diagram representation is shown illustrating aspects of the overlay pedal arrangement of FIG. 4, according to an embodiment of the present invention. In the embodiment of the invention shown in FIGS. 3 and 4, for example, linkage 710 of FIG. 7 includes arm 562 and spring 574 loaded link 572, and controls 720 include switch 576 and control logic for actuating clutch 545 in a fashion like controls 555 of FIG. 3, wherein control logic of controls 620 disengage clutch 545 responsive to sensing that the vehicle is in ETM mode and responsive to sensing actuation of switch 576, which is actuated as a result of the driver depressing pedal 560.

(Responsive to sensing that the vehicle is in ICE mode, control logic of controls 620 overrides the above described response, i.e., ignores the signal that pedal 560 has been depressed insofar as the logic does not cause the actuator of PXU clutch 545 to move clutch 545 to the disengaged position. In an alternative, responsive to sensing that pedal 560 has moved to the clutch disengaged position, control logic of controls 620 causes the actuator of PXU clutch 545 to move clutch 545 to the disengaged position regardless of whether the vehicle is in the ICE mode or ETM mode.)

Arrangements have been described herein that provide a clutch pedal arrangement serving a dual purpose. It should be understood from the foregoing, that the invention is particularly advantageous because a clutch-engaged position is provided for a clutch pedal for both ETM and ICE operation, even though the ICE clutch is automatically disengaged while in ETM operation. This is advantageous because it permits the clutch pedal to be used in the ETM mode to engage and disengage the ETMG by engaging in disengaging the PXU clutch, in addition to its conventional use in the ICE mode to engage and disengage the ICE by engaging in disengaging the ICE clutch.

The descriptions of present embodiments have been presented for purposes of illustration, but are not intended to be exhaustive or to limit the invention to the form disclosed. Many modifications and variations will be apparent to those of ordinary skill in the art.

For example, referring again to FIG. 3 regarding one variation, adding spring 550 loaded link 520P places a second spring load on clutch pedal arm 514 below pivot point 512, i.e., a load in addition to that of link 520 that resists the action by the driver to depress pedal 212 and that tends to restore pedal 212 to the resting position. Spring 550 for link 520P tends to make it harder to depress pedal 212 when in ICE mode. However, the spring 550 for link 520P only has to be strong enough to restore 212 to the resting position. If this additional force resisting the driver's effort to depress pedal 212 is problematic, then a selectively operable, spring-like hydraulic assist device may also be installed in opposition to spring 550. The assist device is controlled responsive to a switch indicating ICE and ETM modes to counteract the force of spring 550 for link 520P when in the ICE mode, so that the only resistance to depressing the clutch 212 in the ICE mode is that associated with the linkage now shown in FIG. 5, which is just for ICE clutch 206. In ETM mode, the linkage for ICE clutch 206 is moved away from clutch pedal arm 514 by actuator 412, as described herein above. Therefore, in the ETM mode the assist device is disabled so that the force of spring 545 for link 520P is not counteracted, thereby allowing spring 545 for link 520P to restore pedal 212 to the resting position after the driver depresses pedal 212.

Regarding another variation, herein above FIG. 3 is described, wherein clutch pedal 212 linkage includes link 520, which touches clutch pedal arm 514 at a certain point on a ball or rod shaped portion thereof. Link 520P touches clutch pedal arm 514 at substantially the same certain point and is spring 550 loaded such that in ETM mode, spring 550 and link 520P hold clutch pedal arm 514 in the same position as shown in FIG. 3 even after actuator 412 moves link 520 to the ICE clutch-disengaged position, which would otherwise release clutch pedal arm 514 from its clutch-engaged position. In an embodiment wherein link 520 is connected to clutch pedal arm 514 such that moving link 520 necessarily moves clutch pedal arm 514, link 520 or 522 is automatically released from clutch arm 524 in ETM mode so that actuator 412 can move clutch arm 524 without moving clutch pedal arm 514.

Figure 6A:
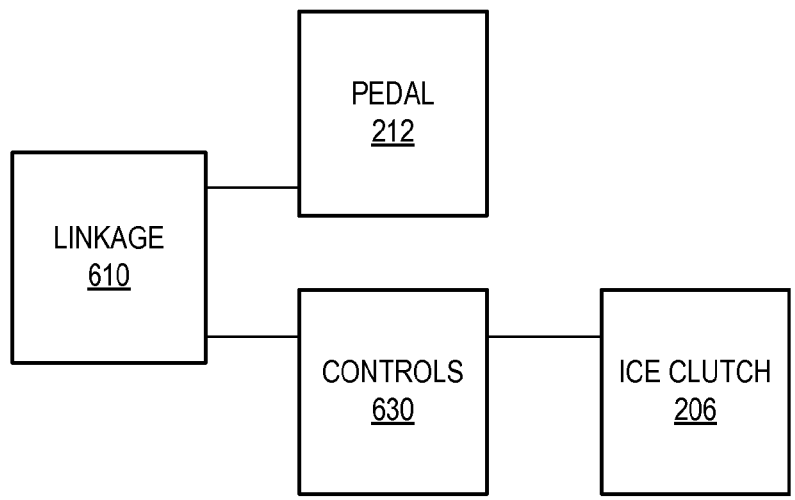
FIG. 6A is a block diagram representation of another prior art arrangement of a clutch pedal, linkage and clutch that also includes controls.

Referring now to FIG. 6A, a block diagram representation is shown illustrating prior art clutch pedal 212, linkage 610, and clutch 206 arrangement for a vehicle. Unlike the mechanical clutch 206 control arrangement of FIG. 3, linkage 610 interfaces clutch pedal 212 to controls 630, which may be hydraulic, pneumatic, or electric, for example. Controls 630 disengage ICE clutch 206 responsive to a driver moving clutch pedal 212 to a clutch disengaged position and engage ICE clutch 206 responsive to the driver allowing clutch pedal to return to a clutch engaged position. Movement of clutch pedal 212 is communicated to controls 630 via linkage 610.

Figure 6B:
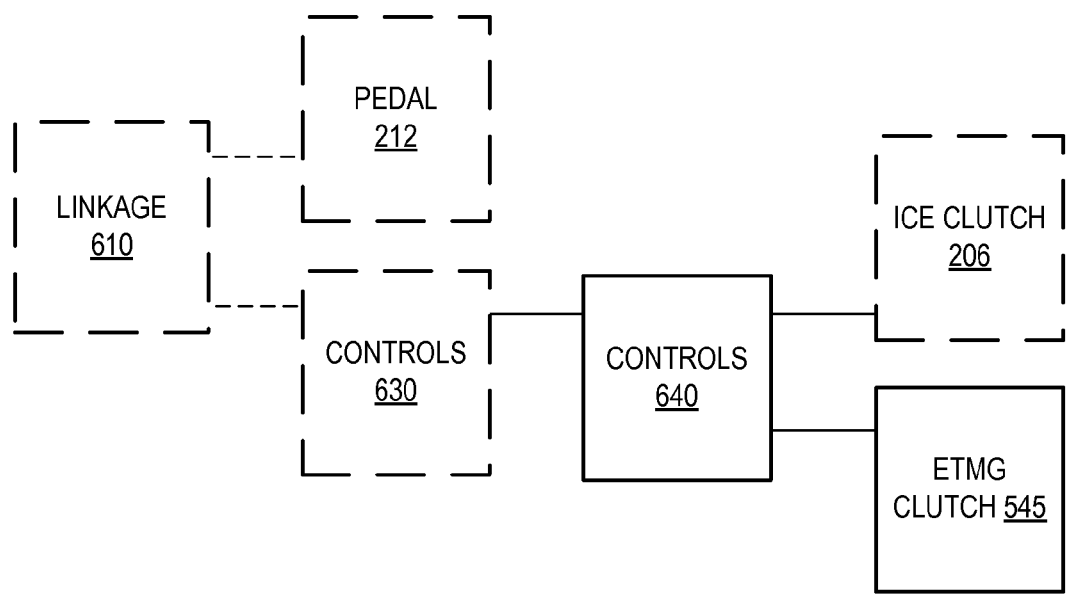
FIG. 6B is a block diagram representation of a retrofit linkage, controls and ETMG clutch connected to OEM controls and ICE clutch, according to an embodiment of the present invention.

Referring now to FIG. 6B, a block diagram representation is shown for an embodiment of the present invention, illustrating the addition of an ETMG clutch 545 and controls 640, which may be hydraulic, pneumatic, or electric, for example. Controls 640 interface to existing controls 630 and to the added clutch 545. Responsive to a signal indicating the vehicle is operating in ETM mode, controls 640 automatically disengage ICE clutch 206. Further, when in ETM mode, controls 640 selectively disengage ETMG clutch 545 responsive to the driver's foot moving clutch pedal 212 to a clutch disengaged position, and engage ETMG clutch 545 responsive to the driver's foot allowing clutch pedal 212 to return to a clutch engaged position.

Responsive to a signal indicating the vehicle is switching to ICE mode, controls 640 ICE release clutch 206 from being automatically held in the disengaged position. Further, responsive to sensing that the vehicle is in ICE mode, control logic of controls 640 overrides the above described response, i.e., ignores the signal that pedal 212 has been depressed insofar as the logic does not cause the actuator of ETMG clutch 545 to move clutch 545 to the disengaged position. In an alternative, responsive to sensing that pedal 212 has moved to the clutch disengaged position, control logic of controls 620 causes the actuator of ETMG clutch 545 to move clutch 545 to the disengaged position regardless of whether the vehicle is in the ICE mode or ETM mode.

Regarding another alternative, refer again to FIG. 5A, which shows a block diagram representation illustrating prior art clutch pedal 212, linkage 610, and clutch 206 arrangement of FIG. 1. Another alternative embodiment of the invention is shown in block diagram FIG. 5B, illustrating the addition of linkage 615 and controls 620 interposed between linkage 610 and ICE clutch 206. Linkage 615 of FIG. 5B includes spring 550 loaded link 520P, and controls 620 of FIG. 5B include actuator 412 for ICE clutch 203, as well as switch 552, control logic 555 in communication with an ICE/ETM mode indication, and a clutch actuator for clutch 545. In that embodiment, actuator 412 is not interposed between original clutch pedal arm 514 and clutch arm 524. In another embodiment of the invention, controls 620 of FIG. 5B may include pneumatic, hydraulic, or electric control logic and devices interposed between original clutch pedal arm 514 and clutch arm 524, such that controls 620 control clutch 206 responsive to clutch pedal 212 in ICE mode, but in ETM mode, control clutch 545 is responsive to clutch pedal 212 and automatically holds clutch 206 disengaged.

In an alternative embodiment of the invention, the ETMG clutch is omitted and retrofit controls and linkage enable an existing clutch pedal (or an existing clutch pedal and an overlay pedal) to be used to signal an electric traction system controller when shifting, wherein the controller modifies its response to the accelerator pedal 213 during shifting.

As described in one of the related patent applications that is cross-referenced and incorporated herein by reference herein above, an ET system controller receives a signal from a push button that has been added to the gear shift lever of the vehicle's ICE manual transmission gear box. According to one embodiment of the present invention, an arrangement like that of FIG. 3 herein is provided, except that ETMG clutch 545 is omitted. According to this embodiment of the invention, clutch pedal 212 activated switch 552 communicates the driver's shifting intention to the ET system controller instead of this being done by a push button switch on the gear shift lever. Similarly, in an embodiment of the present invention having an arrangement like that of FIG. 4 herein but with clutch 545 omitted, clutch pedal 560 activated switch 576 is provided to communicate the driver's shifting intention to the ET system controller instead of this being done by a push button switch on the gear shift lever.

The driver may signal the ET system controller when he/she is about to shift gears in ETM mode by depressing clutch pedal 212 or 560 and actuating switch 552 or 576. The controller responds to the signal from switch 552 or 576 by switching to a "gear shift ETM" state or a "gear shift ICE" state, depending upon whether the controller is in ETM or ICE mode, either of which changes the controller's response to the vehicle's accelerator pedal 213. This causes performance of the vehicle, including shifting performance, to behave in a more nearly conventional manner, despite the addition of the ETMG, its controls, and their corresponding effects on the vehicle. That is, the ETMG may be generating when the vehicle is operating in ICE mode or may be the sole source of vehicle propulsion (as an electric motor) when the vehicle is operating in ET mode. Regardless of what operating mode the vehicle is in, the controller takes actions responsive to the driver's signal from the clutch pedal actuated switch 552 or 576 to cause the performance of the vehicle to behave in a more nearly conventional ICE manner, which in one embodiment is a heavy duty, e.g., class 7 or 8, diesel truck.

More specifically, in response to switch 552 or 576, the controller attenuates its response to the accelerator pedal 213 position so that the driver has more fine control over the ETMG speed via the accelerator pedal 213, whether the ETMG is propelling the vehicle as a motor or regenerating power as a generator. Thus, when propelling the vehicle in ETM mode, for example, the ETMG will more slowly reduce its speed when the operator slightly releases foot pressure on the accelerator pedal 213, which more closely mimics a response of an ICE. Likewise, it is also easier for the operator to more precisely control an increase in ETMG rotational speed due to the attenuated accelerator pedal 213 response. And when the ICE is propelling the vehicle in ICE mode, the ETMG will more slowly increase regeneration torque when the operator slightly releases foot pressure on the accelerator pedal 213.

There are still further ways in which the controller modifies its response to the accelerator pedal 213, according to embodiments of the present invention. In an embodiment of the present invention, the controller modifies its response to cancel the inertial and frictional effects of the PXU and ETMG rotor on the transmission shifting gears. To understand a purpose for this, consider that when shifting, the manual transmission shifting gears are conventionally disconnected from the ICE by disengaging the clutch, and the transmission's output shaft and road wheels are disconnected from the shifting gears by shifting the gear box to neutral. This allows the shifting gears of the transmission to spin freely. In this manner, the driver is accustomed to allowing the transmission shifting gears to coast to a lower RPM when shifting. Then the driver conventionally selects a new shifting gear by the transmission gear shift lever moving a selected gear shifting collar, wherein the shifting collar rotates at a speed corresponding to the transmission output shaft and road wheels. The driver then begins to engage the shifting gear to the shifting collar. If the transmission has synchronizers, this engagement includes the synchronizer of the selected shifting collar frictionally engaging the selected shifting gear to begin matching speeds before the teeth of the selected shifting collar mesh with the selected shifting gear. Also, the driver slowly engages the clutch and by accelerator pedal 213 control of the ICE further adjusts the selected shifting gear speed to match that of the selected shifting collar.

Figure 8:
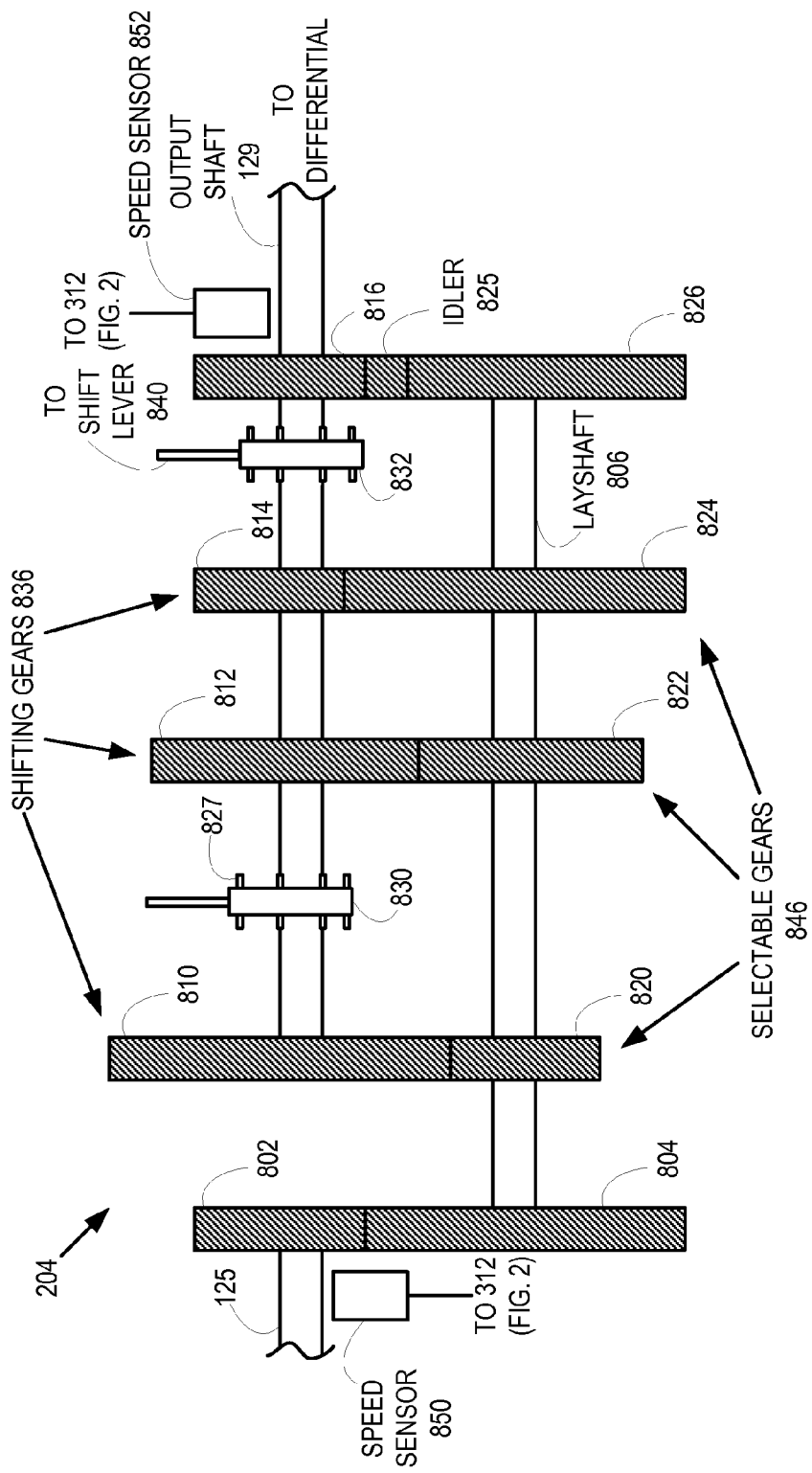
FIG. 8 is a block diagram illustrating aspects of a manual transmission, according to an embodiment of the present invention.

The above description is further described with respect to FIG. 8. If ETMG 306 (FIG. 2) is powered, then it rotates input shaft 125. Gear 802 is rigidly coupled to input shaft 125 and transfers the rotation of input shaft 125 via gear 804 to lay shaft 806. Gears 820, 822, 624, and 825 are all rigidly coupled to lay shaft 806 and all rotate together at the rotational speed of lay shaft 806. Gears 820, 822, 824, and 825 all have different diameters and thus offer the potential of different gear ratios when engaged to rotate another gear. Gear 826 is coupled through an idler gear 825 to gear 816 and serves to provide a reverse gear for the vehicle.

Output shaft 129 is connected to drive the vehicle road wheels through drive shaft 230 and differential 316 (see FIG. 1) and thus rotates in a fixed relation to the road wheels. Output shaft 129 is splined and is directly coupled to shift collars 830 and 832. Shift collars 830 and 832 are configured to move laterally while rotating at the same rotational speed as output shaft 129. Shifting gears 810, 812, 814, and 816 (also referred to herein as shifting gears 836) are always engaged with their corresponding lay shaft gears 820, 822, 624, and 826 (also referred to herein as lay shaft gears 846) and have bearings that allow them to rotate freely on output shaft 129. Shifting collars 830 and 832 are coupled to a shift lever (not shown) that is operable to move shifting collars 830 and 832 by respective shift linkages, one of which is depicted herein as shift linkage (or "rod") 840. With the shifting collars 830 and 832 positioned as shown, transmission 204 (FIG. 2) is in "neutral." In this neutral state, if input shaft 125 is being rotated by ETMG 306, then all the shifting gears 810, etc. and layshaft gears 820, etc. are rotating while output shaft 129 remains stationary (if the vehicle road wheels are also stationary). That is, with the shift lever in the neutral position, shifting collars 830 and 832 are not engaged with any of shifting gears 810, etc., so that shifting gears 810, etc. rotate responsive to the rotation of ETS motor 306 and not the road wheels, while shifting collars 830 and 832 rotate responsive to rotation of road wheels and not the rotation of ETS motor 306.

Shifting collars 830 and 832 have "dog teeth" (e.g., 827) and all of the shifting gears 810, 812, 814, and 816 have mating "holes" for engaging with the dog teeth. Shifting collars 830 and 832 are free to slide along shaft 129 responsive to movement of the shift lever in order to move into a position so that one of the collars 830 or 832 engages one of the shifting gears 810, etc. But shifting collars 830 and 832 are constrained to rotate with shaft 129 by splines of collars 830 and 832 that engage splines of shaft 129. Shifting gears 810, etc. have bearings permitting them to freely rotate on output shaft 129. However, when a shifting collar 830 or 832 is in engagement with a shifting gear (e.g., 812), the shifting gear is able to drive the vehicle wheels through the splines coupling the shifting collar to drive the output shaft 129. The rotational speed of output shaft 129 is determined by the gear ratio of the shifting gear (e.g., 812) and the corresponding lay shaft gear (in this example, gear 822). Therefore, if gear 810 is selected, output shaft 129 rotates the slowest for a given ETMG 306 rotational speed because layshaft gear 820 is the smaller than 822 or 824 and shifting gear 810 is larger than shifting gears 812 or 814.

For a given ETMG 306 rotational speed, there is a specific output shaft rotational speed that corresponds to which shifting gear (810, 812, or 814) is engaged with either shift collar 830 or 832. When shifting gears, switching between shifting gears 810, 812, or 814, the output shaft rotational speed needs to be matched to the corresponding "shifting to" gear. Remember, in neutral and with ETMG 306 driving input shaft 125, all the non-selected shifting gears 810, etc. are rotating freely on output shaft 129 at a rotational speed determined by ETMG 306 rotational speed and their particular gear ratio. With transmission 122 in neutral, shifting collars 830 and 832 rotate at the speed of output shaft 129, which is directly related to the vehicle speed because the road wheels are turning shaft 129.

If the rotational speed of output shaft 129 is not matched to a next gear 810, etc. being "shifted to," then dog teeth 830, etc. and the matching holes in the next gear 810, etc. will "clash," producing what is known as "gear clash." (Note that the gear teeth of shifting gears 810, etc. and corresponding lay shaft gears 820, etc. do not actually clash, since all are in constant engagement.)

Therefore, the problem of shifting gears is that the shifting collars 830 and 832 rotate at the same speed as the output shaft 129, and the shifting gears (on the output shaft) rotate at a speed determined by the input shaft speed and the particular gear ratio between lay shaft gears 820, etc. and shifting gears 810, etc.

In at least some embodiments, the ETM mode is "clutch free" to reduce equipment costs and to optimize the ability to recover vehicle kinetic energy during down-shifting and breaking. Shifting a manual transmission without a clutch to disengage the ETM may be improved by the use of synchronizers built into the shifting collars (e.g., 830 and 832). Synchronizers are configured to first engage the shifting collar to a next gear with a frictional drive that serves to match the rotational speed of the output shaft with the ETM rotational speed (shifting gear) through frictional losses before rigidly engaging the dog teeth (e.g., 827) to lock output shaft 129 to the corresponding next shifting gear (e.g., 810, 812, and 814). While this would enhance the ability of the driver to shift gears, it comes at increased costs and lower efficiency.

According to an embodiment of the present invention, PXU 304 is rotatably coupled to the shifting gears of transmission 204, and ETMG 306 is coupled to the PXU. This affects the way the shifting gears 836 coast down to a lower RPM when ICE clutch 206 is disengaged and the transmission gear box is in neutral. That is, the shifting gears may coast down more slowly or more quickly due to the PXU/ETMG, depending on the particular inertia and friction characteristics of PXU 304 and ETMG 306. Consequently, in an embodiment of the invention, controls are configured to modify ETMG demand signal generation by controller 312 such that when the clutch pedal is in an actuated (i.e., clutch-disengaged) position, controls 312 generate a predetermined ETMG demand signal independent of the accelerator pedal 213 position, where the predetermined ETMG demand signal tends to cancel the inertial and frictional effects of the PXU and ETMG on the transmission shifting gears. (The term "clutch pedal" as used herein may refer to the overlay clutch pedal 560, the OEM clutch pedal 212, or both, depending upon the context. In one of the above described embodiments of the invention in which there is no overlay pedal 560, the term "clutch pedal" refers to OEM pedal 212. In an embodiment in which there is an overlay pedal 560 and in a context wherein the vehicle is in ICE mode, for example, then if a reference is made herein to manually actuating the clutch pedal, this is generally intended as moving overlay pedal 560 to an actuated position.)

This is not to say that the predetermined ETMG demand signal, which the controls generate independently of the accelerator pedal 213 position, necessarily supersedes the variable ETMG demand signal, which the controls generate responsive to the accelerator pedal 213 position. Rather, the controls may be configured to generate ETMG demand signal components and superimpose the component signals upon one another to provide an overall ETMG demand signal. That is, according to an embodiment of the invention, the predetermined ETMG demand signal is one component of the overall ETMG demand signal, while the variable ETMG demand signal is another component of the overall ETMG demand signal.

The predetermined ETMG demand signal that tends to cancel the inertial and frictional effects of the PXU and ETMG rotor may be a signal that tends to cause the ETMG to operate as a motor (i.e., to "motor") or else a signal that tends to cause the ETMG to operate as a generator. Stated another way, the controls are configured based upon predetermined inertia and friction characteristics of the PXU and ETMG rotor. More particularly, responsive to the clutch pedal being in an actuated position, the controls generate a predetermined ETMG demand signal for positive torque that motors the ETMG, provided that the designer preconfigured the controls based on a predetermination that, during some time interval after ICE clutch disengagement begins, frictional effects of the PXU and ETMG rotor tend to exceed inertial effects, thereby producing a net frictional effect. Conversely, the controls generate a predetermined ETMG demand signal that tends to cause a negative torque on the ETMG, causing the ETMG to generate, provided that the designer preconfigured the controls based on a predetermination that during some time interval after ICE clutch disengagement begins inertial effects of the PXU and ETMG rotor tend to exceed frictional effects, thereby producing a net inertial effect.

The nature of the control configuration for generating the predetermined ETMG demand signal may depend upon the designer's predetermination of the coasting characteristic of the PXU-ETMG-rotor combination, which may be a time varying characteristic. Accordingly, the controls may be configured to generate the predetermined ETMG demand signal such that, while the clutch is disengaged, the predetermined ETMG demand signal is i) fixed, ii) changing over time, iii) fixed and then changing over time, or iv) changing over time and then fixed, where the changing over time may be at a predetermined rate or rates. Further, the fixed and/or changing portions of the predetermined ETMG demand signal during the clutch disengagement may be for the duration of the clutch disengagement or for respective predetermined time intervals after disengagement begins.

The coasting characteristic of the PXU-ETMG-rotor combination may vary depending upon speed of the vehicle at the time coasting of the combination begins. Accordingly, the designer may predetermine the relation between initial coasting speed and the coasting characteristic of the combination. The controls may, accordingly, be configured to include a tachometer, or to communicate with an existing tachometer (also known as a speedometer), wherein the tachometer directly or indirectly indicates rotational speed of the PXU-ETMG-rotor combination. Correspondingly, the controls may be preconfigured to generate different predetermined ETMG demand signals for respective different initial coasting speeds.

In an alternative, the controls may be configured to dynamically determine the PXU-ETMG-rotor combination's net frictional or net inertial tendency throughout at least a portion of the combination's coasting time, where the determination is responsive to the tachometer indicated rotational speed of the PXU-ETMG-rotor combination during at least an interval of the coasting. According to this alternative, the controls are configured to dynamically generate the "predetermined" ETMG demand signal (i.e., the component of the overall ETMG demand signal that is independent of the accelerator pedal 213 position) responsive to the net frictional or inertial effect that is, itself, dynamically determined by the controls.

In yet another embodiment of the invention, the controller modifies its response to the accelerator pedal 213 during shifting as described above even though the ETMG clutch is included.

Figure 9:
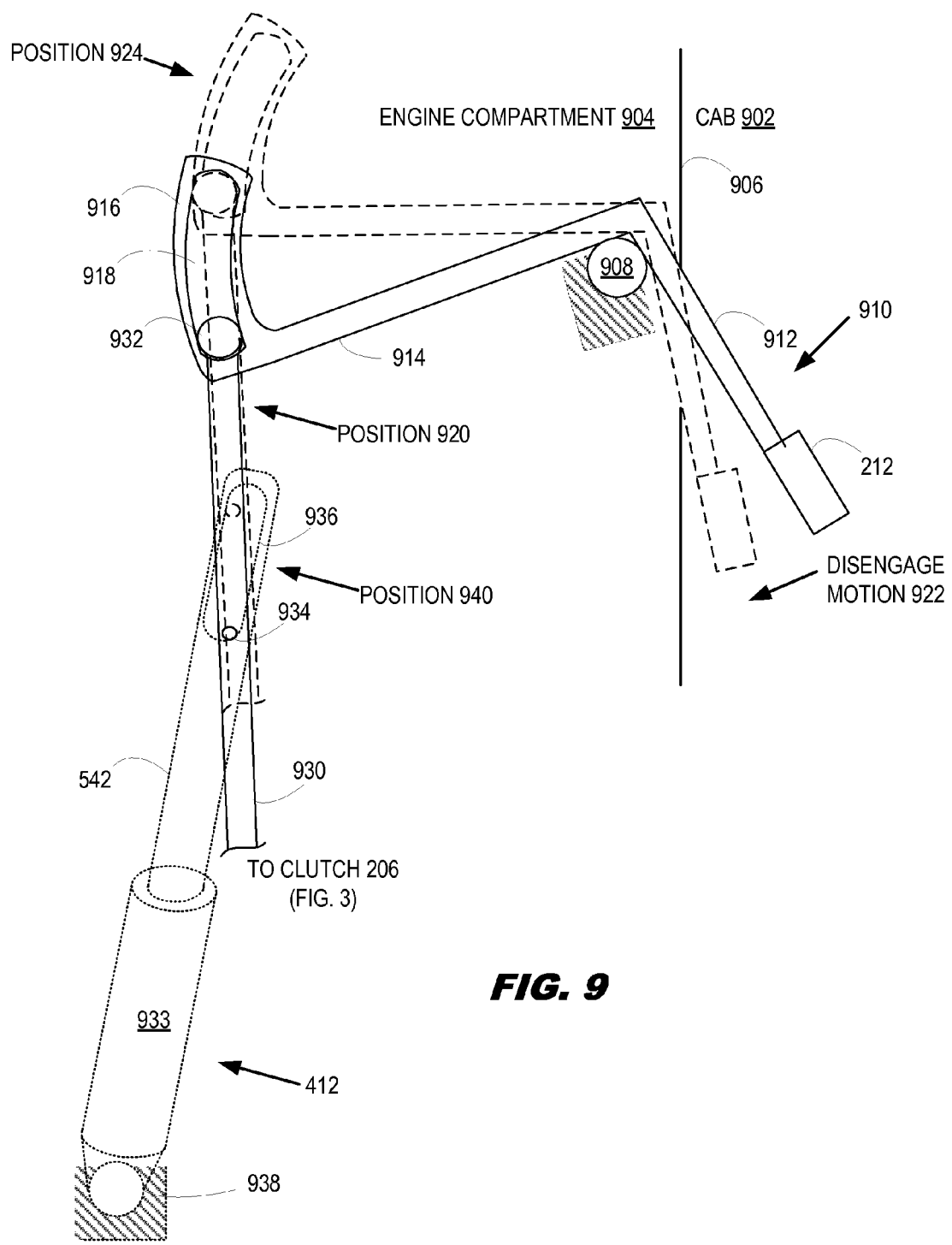
FIG. 9 shows a configuration of retrofit devices for enabling dual mode operation of a clutch, which particularly shows positions of the devices illustrating how a user may disengage the clutch via a clutch pedal without interference from an automatic clutch actuator, according to an embodiment of the invention.

Referring now to FIG. 9, a configuration of retrofit devices are shown for enabling dual mode operation of clutch 206, according to embodiments of the invention. The configuration shown in FIG. 9 enables retrofitting an original equipment manufacturer vehicle in such a way as to permit a user (e.g., driver) to disengage original equipment manufacturer clutch 206 for a manual transmission 204 by depressing pedal 212 in a disengaging motion 922, in the same manner as before addition of the retrofit devices. The retrofit devices as shown in FIG. 9 also enable automatic disengagement of clutch 206 by operation of actuator 412, without interfering with user movement of clutch pedal 212. This will be described in connection with FIGS. 10 and 11. The following description of FIG. 9, however, explains how the retrofit configuration enables actuator 412 to remain essentially stationary and not interfere with original equipment manufacturer operation.

Clutch pedal 212 is attached to a pedal movement transfer assembly 910, which includes a first segment fixed to pedal 212, a second segment 914 fixed to segment 912, and a third segment 916 fixed to segment 914. At least part of segment 912 is inside cab 902 of vehicle 202, and is configured such that pedal 212, attached to one end, is below the other end of segment 912, which is attached to segment 914 at a fixed pivoting connection 908, a connection to assembly 910 that is fixed relative to the frame of vehicle 202 and that permits rotation of assembly 910 in one plane. Connection 908 may be inside engine compartment 904, as shown, or may be inside cab 902.

In order to position portions of assembly 910 relative to pedal 212, connection 908, link 930 and actuator 412 such that the functioning described herein is enabled, the lengths of segments 912 and 914 and those of segments 914 and 916 may form approximately right angles, as shown, or may form other angles, depending upon the configuration of vehicle 202. Likewise, segments 912, 914 and 916 may have lengths relative to one another as shown, or may have different proportions, as dictated by the configuration of vehicle 202. It should be understood that FIG. 9 is not necessarily shown to scale.

Link 930 connects at one end to segment 916 by a pivoting and sliding connection 932 captured by slot 918, so that link 930 can rotate in one plane relative to pedal movement transfer assembly 910 and can also slide the length of slot 918. In the configuration shown, segment 916 is curved back toward pivoting connection 908. Segment 916 defines a correspondingly curved slot 918. This configuration may be provided in embodiments of the invention because it tends to minimize lateral movement of connection 932 when connection 932 slides up and down in slot 918, and, therefore, tends to maintain constant alignment of link 930 despite its up and down movement.

Link 930 is configured for transferring movement of pedal clutch pedal 212, via corresponding movement of pedal movement transfer assembly 910, to a mechanism (not shown in FIG. 9) for engaging and disengaging clutch 206 (e.g., FIG. 3). Such a mechanism is shown as clutch arm 524 in FIG. 3. (Note that the disengaging motion of link 930 in FIG. 9 is not necessarily in the same direction as disengaging motion 534 shown for clutch arm 524 in FIG. 3. Disengaging motion of link 930 in FIG. 9 may be translated into a different direction beyond the portion of link 930 that is shown. Alternatively, for embodiments of clutch 206 compatible with FIG. 9, clutch 206 may be configured to disengage responsive to a disengaging motion that has different than the disengaging motion shown for clutch arm 524 of FIG. 3.)

Pedal movement transfer assembly 910 may be biased by a spring (not shown) such that assembly 910 spring-returns to a released position, shown in FIG. 9 as clutch engaged position 920. A user (driver) may depress pedal 212, thereby rotating assembly 910 about pivot connection 908. With pedal 212 fully depressed, assembly 910 is moved to the clutch engaged position 924 shown in FIG. 9.

The movement of assembly 910 from position 920 to position 924 causes link 930 to move upward as shown, due to pivoting and sliding connection 930 in slot 918. This movement of link 930 causes clutch 206 to disengage.

Figure 10:
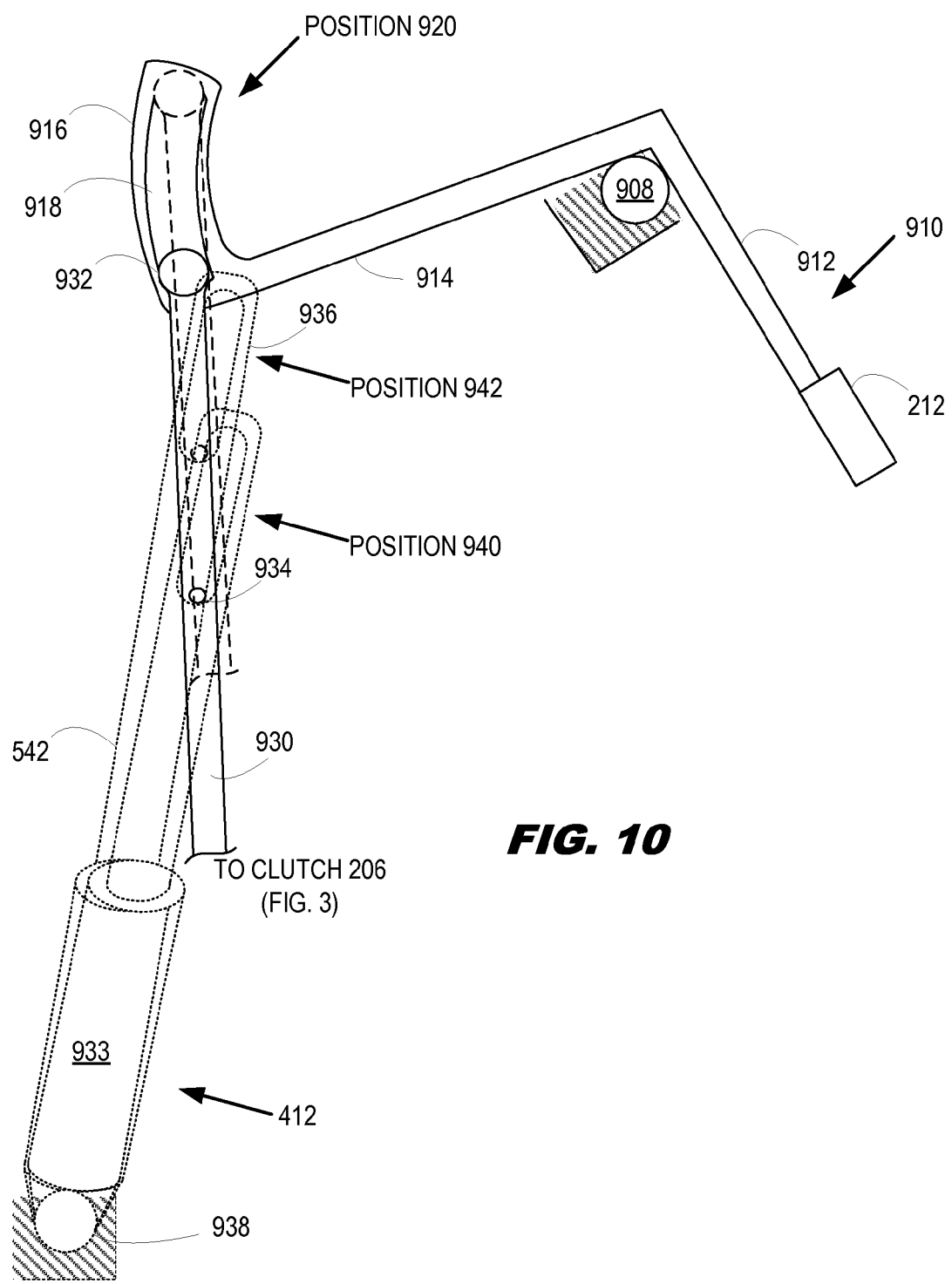
FIG. 10 shows the configuration of retrofit devices of FIG. 9 in other positions, which particularly shows how the automatic clutch actuator may disengage the clutch without interfering with freedom of the clutch pedal and without substantially moving the clutch pedal, according to an embodiment of the invention.

Actuator 412 includes cylinder 933, which is capable of moving extensible shaft 542 in and out within a range of positions from a fully retracted position 940, as shown in FIG. 9, to a fully extended position 942, as shown in FIG. 10. Cylinder 933 is connected by a pivoting connection 938, that is, a connection that is fixed relative to the frame of vehicle 202 and that permits rotation of cylinder 933 in one plane.

At an end opposite cylinder 933, shaft 542 defines a slot 936, in which a pivoting and sliding connection for link 930 is captured, so that cylinder 933 can rotate in one plane relative to link 930 and can slide the length of slot 936.

Note that the above described configuration and further details shown in FIG. 9 enable the movement of link 930 upward (responsive to movement 922 causing movement of assembly 910 from position 920 to position 924, as previously described) without substantial movement of actuator 412. Thus with actuator 412 retracted, it does not interfere with original equipment manufacturer operation in which the user depresses clutch pedal 212 to disengage clutch 206. This is accomplished at least partly due to the configuration as shown, wherein shaft 542 is nearly parallel to link 930 and wherein connection 934 can slide from one end of slot 936 proximate to cylinder 933 to the distal end of slot 936.

In some embodiments, this is also enabled partly due to the width of slot 936, which allows actuator 412, including shaft 542, to deviate somewhat from a parallel alignment with link 930, since pivoting and sliding connection 934 can move from one side of slot 936 to the other side without causing shaft 542 to substantially move. In some embodiments, this is also enabled partly due to the ability of actuator 412 including shaft 542, to rotate about pivoting connection 938.

It should be appreciated that with shaft 542 in the retracted position 940, when pedal 212 is depressed (and assembly 910 correspondingly in position 924), this moves the bottom end of slot 918 into an upward most position which lifts link 930 via the bottom of connection 932. In turn, actuator 412 is correspondingly positioned 940 such that this moves connection 934 to the top end of. Likewise, when pedal 212 is released (and assembly 910 correspondingly in position 920), this moves the bottom end of slot 918 into a downward most position which lowers link 930 via the bottom of connection 932. In turn, actuator 412 is correspondingly positioned 940 such that this moves connection 934 to the bottom end of shaft 542.

Figure 11:
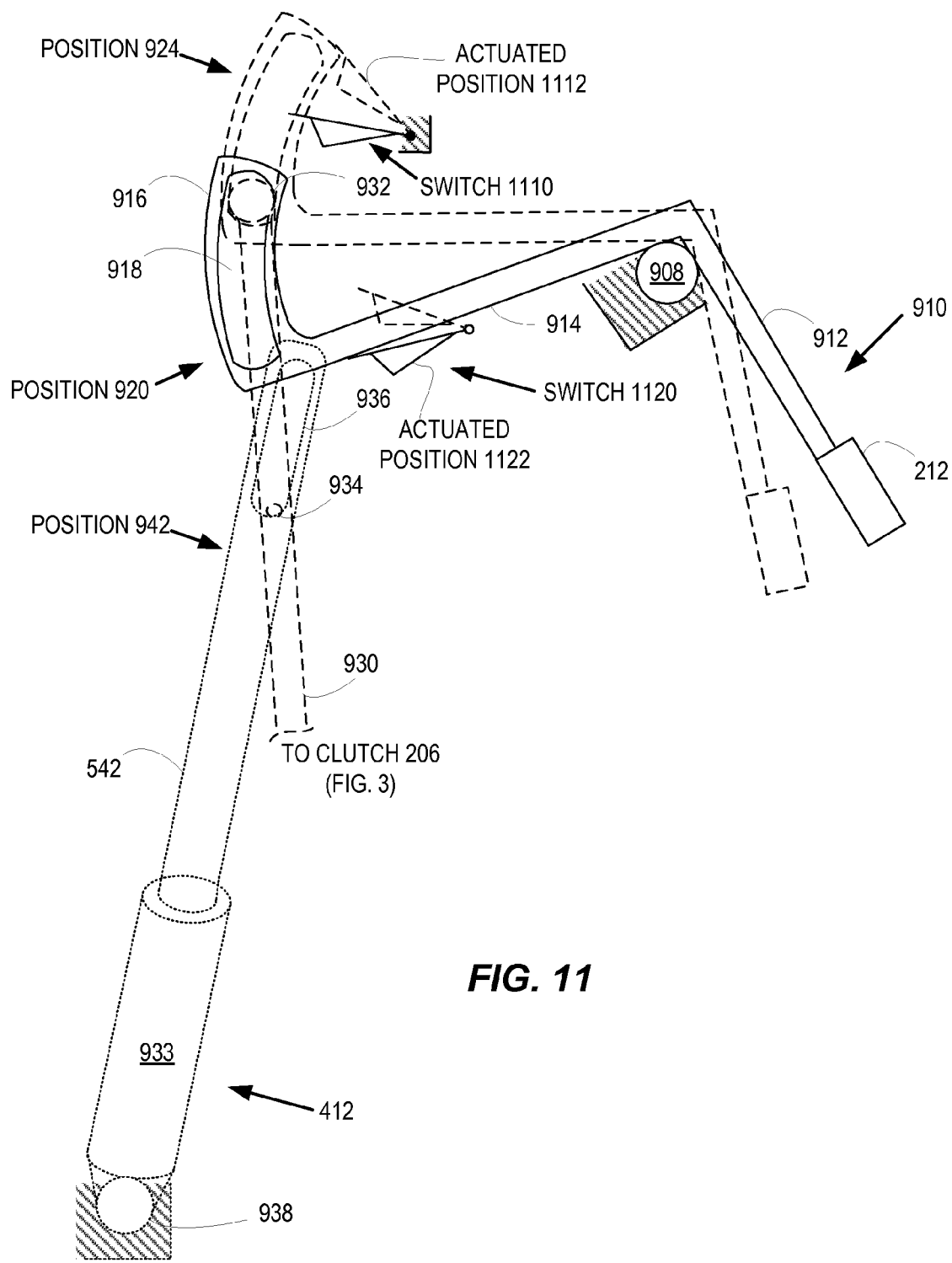
FIG. 11 shows the configuration of retrofit devices of FIG. 9 in other positions, which particularly shows how the user may depress and release the clutch pedal, even though the actuator has the clutch disengaged, according to an embodiment of the invention.

Referring now to FIG's 10 and 11, operation is further illustrated for the retrofit devices shown in FIG. 9, according to embodiments of the present invention. FIG. 10 shows how the configuration enables automatic actuator 412 to disengage clutch 406 without moving clutch pedal 212 from its released position. FIG. 11 shows how the configuration enables the user to depress and release clutch pedal 212 in a fashion normally permitted by the original equipment manufacturer even with actuator 412 shaft 542 extended. This is useful, because it allows automatically disconnecting the vehicle's internal combustion engine from the manual transmission (for operating in an electric traction mode) via actuator 412 extending its shaft 542, in order to disengage clutch 206, while still permitting the driver to depress and release clutch pedal 212 in a fashion normally permitted by the original equipment manufacturer.

FIG. 10 shows clutch pedal 212 in the released position (that is, with pedal movement transfer assembly 910 in the clutch engaged position 920) and shows that without affecting clutch pedal 212 position actuator 412 may be in a position 940, in which shaft 542 is retracted, or may be a position 942, in which shaft 542 is fully extended. With shaft 542 in the extended position 942, the bottom end of slot 936 (that is, the end proximate to cylinder 933) is extended higher than with shaft 542 in the retracted position 940. In this position 942, connection 934 is pushed upward by the bottom end of slot 936, forcing link 930 upward, since connection 934 is fixed to link 930. However, the sliding, pivoting nature of connection 934 permits connection 934 to slide to the top of slot 918 (in segment 916) without moving assembly 910.

More specifically, with shaft 542 retracted, the bottom end of slot 936 holds up connector 934 on link 930, which holds connector 932 at the top of link 930 in a lowermost position in which the bottom of connector 932 sits loosely against the bottom end of slot 918 in segment 916 of assembly 910. And with shaft 542 fully extended, the bottom end of slot 936 holds up connector 934 to a higher position, which holds connector 932 in a higher most position in which the top of connector 932 presses loosely against the top end of slot 918.

FIG. 11 shows actuator 412 with shaft 542 in the fully extended position 942, and shows that the user may depress and release clutch pedal 212 without substantially moving actuator 412 or link 930. This is because, as stated previously, in position 942 connection 934 is pushed upward by the bottom end of slot 936 in shaft 542 of actuator 412, holding link 930 in its upward most position. Thus, assembly 910 is permitted by slot 918 to move to position 924 with clutch pedal 212 depressed and to position 920 with clutch pedal 212 released without interference from connector 932, which is on the top end of link 930. That is, connector 932 is capable of sliding to the bottom end of slot 918 with the clutch pedal depressed (and assembly 910 in corresponding position 924), because with assembly 910 in upward-most position 924, the bottom end of slot 918 in segment 916 is at a position in which the bottom of connector 932 is held by the bottom end of slot 936 in fully extended shaft 542 bearing against connector 934 on link 930. And connector 932 is capable of sliding to the top end of slot 918 with the clutch pedal released (and assembly 910 in corresponding position 920), because with assembly 910 in downward most position 920, the top end of slot 918 in segment 916 is at a position in which the top of connector 932 is held by the bottom end of slot 936 in fully extended shaft 542 bearing against connector 934 on link 930.

Even though in a retrofit electric traction mode the clutch pedal 212 wall not engage and disengage clutch 206 with actuator 412 in the position 942, as shown in FIG. 11, since clutch 206 is already disengaged, it is still useful to provide this freedom of clutch pedal 212 operation, because it enables a driver to effect changes in the electric traction motor via clutch pedal 212 positions signaling the electric traction control system. To facilitate this signaling, position switches 1110 and 1120 are provided as shown, in embodiments of the present invention. Switches 1110 and 1120 are mounted in movable positions such that with assembly 910 in upward most position 924, i.e., with clutch pedal 212 depressed, switch 1110 is moved to an actuated position 1112. Switch 1110 is communicatively coupled to the electric traction control system, so that the changes to the operation of the electric traction motor may be effectuated responsive to actuation of the switch. Similarly, switch 1120 is moved to an actuated position 1122 responsive to assembly 910 moving to position 920, i.e., with clutch pedal 212 released. Switch 1120 is likewise communicatively coupled to the electric traction control system to effect changes in operation of the electric traction motor responsive to actuation of the switch.

As will be appreciated by one skilled in the art, aspects of the present invention may be embodied as a system, method, and/or program product. Accordingly, aspects of the present invention may take the form of an entirely hardware embodiment, an entirely software embodiment (including firmware, resident software, micro-code, etc.), or embodiments combining software and hardware aspects that may all generally be referred to herein as a "circuit," "module," or "system." Furthermore, aspects of the present invention may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The figures illustrate architecture, functionality, and operation of possible implementations of systems, methods and program products according to various embodiments of the present invention. In this regard, a block may represent a module, segment, or portion of code, which comprises one or more executable program instructions for implementing the specified logical function(s). It should also be noted that, in some implementations, functions noted in blocks may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to a processor and/or controller of a general purpose computer, special purpose computer, or other programmable data processing apparatus (e.g., controller) to produce a machine, such that the instructions, which execute via the processor of the computer or other programmable data processing apparatus, create means for implementing the functions/acts specified in the flowchart and/or block diagram block or blocks.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. For example, a module may be implemented as a hardware circuit comprising custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices or the like.

Computer program code, i.e., instructions, for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide may be a network (WAN), or the connection may be made to an external computer (for example, through the Internet using an Internet Service Provider).

These program instructions may also be stored in a computer readable storage medium that can direct a computer, other programmable data processing apparatus, controller, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Reference is made herein to "configuring" a retrofit control device. It should be understood that this may include selecting predefined logic blocks and logically associating them, such that they provide particular logic functions, which includes monitoring or control functions. It may also include programming computer software-based logic of retrofit control device, wiring discrete hardware components, or a combination of any or all of the foregoing.

Reference throughout this specification to "one embodiment," "embodiments," or similar language means that a particular feature, structure, or characteristic described in connection with the embodiments is included in at least one embodiment of the present invention. Thus, appearances of the phrases "in one embodiment," "in an embodiment," "embodiments," and similar language throughout this specification may, but do not necessarily, all refer to the same embodiment. Furthermore, the described features, structures, aspects, and/or characteristics of the invention may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations may be not shown or described in detail to avoid obscuring aspects of the invention.

Figure 12:
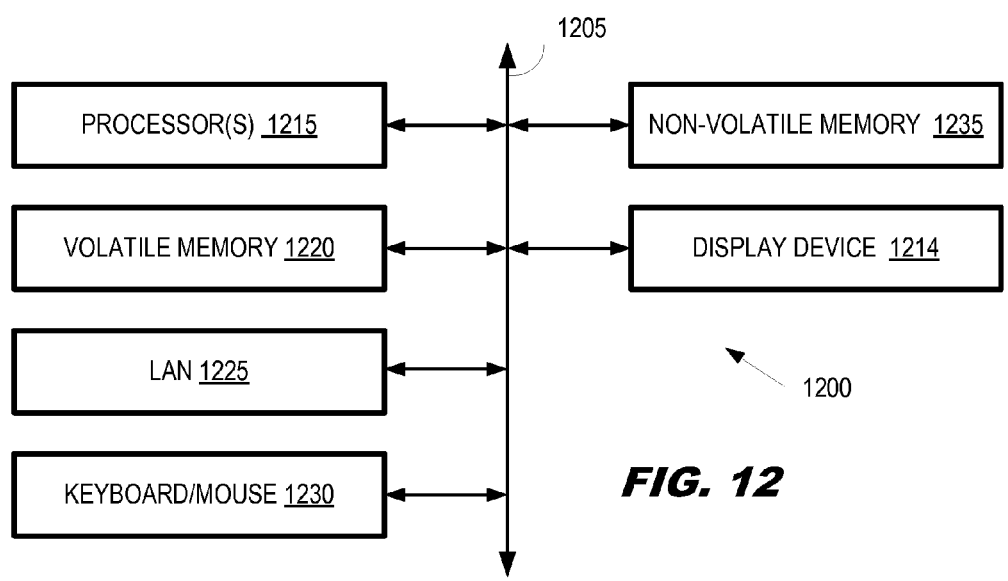
FIG. 12 illustrates a computer system for controlling aspects of vehicle operation, according to an embodiment of the invention.

With reference now to FIG. 12, a block diagram illustrating a computer system is depicted in which aspects of embodiments of the invention may be implemented. Computer system 1200 may employ a peripheral component interconnect (PCI) local bus architecture. Although the depicted example employs a PCI bus, other bus architectures such as Accelerated Graphics Port (AGP) and Industry Standard Architecture (ISA) may be used, among others. Processor 1215, volatile memory 1220, and non-volatile memory 1235 may be connected to PCI local bus 1205 through PCI Bridge (not shown). The PCI Bridge also may include an integrated memory controller and cache memory for processor 1215. Additional connections to PCI local bus 1205 may be made through direct component interconnection or through add-in boards. In the depicted example, a network (LAN) adapter 1225, small computer system interface (SCSI) host bus adapter (not shown), and expansion bus interface (not shown) may be connected to PCI local bus 1205 by direct component connection. In contrast, audio adapter (not shown), graphics adapter (not shown), and audio display adapter 1214 may be connected to PCI local bus 1205 by add-in boards inserted into expansion slots.

Expansion bus interface (not shown) provides a connection for a keyboard and mouse adapter 1230, modem (not shown), and additional memory (not shown). SCSI host bus adapter (not shown) provides a connection for a hard disk drive, tape drive, and CD-ROM drive. Typical PCI local bus implementations will support three or four PCI expansion slots or add-in connectors.

An operating system may be run on processor 1215 and used to coordinate and provide control of various components within computer system 1200 in FIG. 12 the operating system may be a commercially available operating system. An object oriented programming system such as Java may run in conjunction with the operating system and provide calls to the operating system from Java programs or programs executing on system 1200. Instructions for the operating system, the object-oriented operating system, and programs may be located on non-volatile memory 1235 storage devices, such as a hard disk drive, and may be loaded into volatile memory 1220 for execution by processor 1215.

Those of ordinary skill in the art will appreciate that the hardware in FIG. 12 may vary depending on the implementation. Other internal hardware or peripheral devices, such as flash ROM (or equivalent nonvolatile memory) or optical disk drives and the like, may be used in addition to or in place of the hardware depicted in FIG. 12 Also, the processes of the present invention may be applied to a multiprocessor computer system.

As another example, computer system 1200 may be a stand-alone system configured to be bootable without relying on some type of network communication interface, whether or not computer system 1200 includes some type of network communication interface. As a further example, computer system 1200 may be an embedded controller, which is configured with ROM and/or flash ROM providing non-volatile memory storing operating system files or user-generated data.

The depicted example in FIG. 12 and above-described examples are not meant to imply architectural limitations. Further, a computer program form of the present invention may reside on any computer readable storage medium (i.e., floppy disk, compact disk, hard disk, tape, ROM, RAM, etc.) used by a computer system. (The terms "computer," "system," "computer system," and "computer system" and may be used interchangeably herein.)

Benefits, advantages and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims.

Those skilled in the art having read this disclosure will recognize that changes and modifications may be made to the embodiments without departing from the scope of the present invention. It should be appreciated that the particular implementations shown and described herein may be illustrative of the invention and its best mode and may be not intended to otherwise limit the scope of the present invention in any way. Other variations may be within the scope of the following claims.

While this specification contains many specifics, these should not be construed as limitations on the scope of the invention or of what can be claimed, but rather as descriptions of features specific to particular implementations of the invention. Headings herein may be not intended to limit the invention, embodiments of the invention or other matter disclosed under the headings.

As used herein, the terms "comprises," "comprising," or any other variation thereof, may be intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

Herein, the term "or" may be intended to be inclusive, wherein "A or B" includes A or B and also includes both A and B.

The terminology used herein is for the purpose of describing particular embodiments only and is not intended to be limiting of the invention. As used herein, the singular forms "a," "an," and "the" may be intended to include the plural forms as well, unless the context clearly indicates otherwise. It will be further understood that the terms "comprises" and/or "comprising," when used in this specification, which may include the claims herein below, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below may be intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as may be suited to the particular use contemplated.

What is claimed is:

1. In a vehicle having a manual transmission coupled to an internal combustion engine ("ICE") via a first clutch, the first clutch configured to respond to movement of a clutch pedal, wherein in an ICE mode of vehicle operation, the vehicle is configured so that the ICE propels the vehicle responsive to movement of an accelerator pedal, a system comprising:
   an electric motor coupled to the manual transmission and configured for propelling the vehicle in an electric traction motor ("ETM") mode of vehicle operation; and
   controls configured for (i) generating an ETM demand signal responsive to a position of the accelerator pedal, and (ii) modifying the generating of the ETM demand signal responsive to a position of the clutch pedal, wherein the electric motor is configured to adjust its output torque as a function of a magnitude of the ETM demand signal, wherein the controls configured for modifying the ETM demand signal are further configured for generating, for a given accelerator pedal position, a smaller non-zero magnitude of the ETM demand signal when the clutch pedal is in an actuated position than when the clutch pedal is in a resting position.

2. In a vehicle having a manual transmission coupled to an internal combustion engine ("ICE") via a first clutch, the first clutch configured to respond to movement of a clutch pedal, wherein in an ICE mode of vehicle operation, the vehicle is configured so that the ICE propels the vehicle responsive to movement of an accelerator pedal, a system comprising:
   an electric motor coupled to the manual transmission and configured for propelling the vehicle in an electric traction motor ("ETM") mode of vehicle operation; and
   controls configured for (i) generating an ETM demand signal responsive to a position of the accelerator pedal, and (ii) modifying the generating of the ETM demand signal responsive to a position of the clutch pedal, wherein the electric motor is configured to adjust its output torque as a function of a magnitude of the ETM demand signal, wherein the controls are further configured for generating a predetermined non-zero ETM demand signal independent of the position of the accelerator pedal when the clutch pedal is in an actuated position.

3. In a vehicle having a manual transmission coupled to an internal combustion engine ("ICE") via a first clutch, the first clutch configured to respond to a clutch pedal position, wherein in an ICE mode of operation, the ICE propels the vehicle responsive to an accelerator pedal position, a method comprising:
   propelling the vehicle via an electric traction motor ("ETM") in an ETM mode of operation by a controlled response of the vehicle to the accelerator pedal position;
   disengaging the first clutch and holding the first clutch disengaged in the ETM mode, so that the ICE is disengaged from the manual transmission during the ETM mode of operation; and
   changing the controlled response as a result of detected positions of the clutch pedal during the ETM mode of operation, wherein propelling the vehicle by the controlled response comprises generating an ETM demand signal responsive to the accelerator pedal position, and wherein changing the controlled response includes generating, for a given accelerator pedal position, a smaller non-zero ETM demand signal when the clutch pedal is in an actuated position than when the clutch pedal is in a resting position.

4. In a vehicle having a manual transmission coupled to an internal combustion engine ("ICE") via a first clutch, the first clutch configured to respond to a clutch pedal position, wherein in an ICE mode of operation, the ICE propels the vehicle responsive to an accelerator pedal position, a method comprising:
   propelling the vehicle via an electric traction motor ("ETM") in an, ETM mode of operation by a controlled response of the vehicle to the accelerator pedal position;
   disengaging the first clutch and holding the first clutch disengaged in the ETM mode, so that the ICE is disengaged from the manual transmission during the ETM mode of operation; and
   changing the controlled response as a result of detected positions of the clutch pedal during the ETM mode of operation, wherein propelling the vehicle by the controlled response comprises generating an ETM demand signal responsive to the accelerator pedal position, and wherein changing the controlled response includes generating a predetermined non-zero ETM demand signal independent of the accelerator pedal position when the clutch pedal is in an actuated position.

5. In a vehicle having a manual transmission coupled to an internal combustion engine ("ICE") via a first clutch, the first clutch configured to respond to a clutch pedal, wherein in an ICE mode of vehicle operation, the ICE propels the vehicle responsive to an accelerator pedal, a method of retrofitting the vehicle comprising:
  coupling an electric traction motor ("ETM") to the manual transmission in a configuration for propelling the vehicle; and
  coupling controls to the vehicle, the controls configured for disengaging the first clutch and causing the vehicle to be propelled via the ETM during an ETM mode of operation by a controlled response of the ETM to a position of the accelerator pedal, wherein the controls are further configured to (1) detect resting and actuated positions of the clutch pedal, and (2) responsively change the controlled response of the ETM to the accelerator pedal during the ETM mode of operation, wherein the controls are configured to generate an ETM demand signal having a magnitude responsive to a detected position of the accelerator pedal, wherein the controls are further configured for generating, for the given accelerator pedal position, a smaller non-zero magnitude of the ETM demand signal when the clutch pedal is in the actuated position than when the clutch pedal is in the resting position.

6. The method of claim 5, wherein the controls are configured, during both the ETM and ICE modes of operation, to generate, for a given accelerator pedal position, the smaller non-zero magnitude of the ETM demand signal when the clutch pedal is in the actuated position than when the clutch pedal is in the resting position.

* * * * *